(12) United States Patent  
Bar-Zeev et al.

(10) Patent No.: US 9,304,319 B2  
(45) Date of Patent: Apr. 5, 2016

(54) AUTOMATIC FOCUS IMPROVEMENT FOR AUGMENTED REALITY DISPLAYS

(75) Inventors: Avi Bar-Zeev, Redmond, WA (US); John Lewis, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 909 days.

(21) Appl. No.: 12/949,650

(22) Filed: Nov. 18, 2010

(65) Prior Publication Data

US 2012/0127062 A1     May 24, 2012

(51) Int. Cl.
```
G09G 5/00      (2006.01)
G02B 27/01     (2006.01)
G02B 3/14      (2006.01)
G06F 3/01      (2006.01)
```
(52) U.S. Cl.
CPC ............... *G02B 27/017* (2013.01); *G02B 3/14* (2013.01); *G06F 3/011* (2013.01); *G06F 3/013* (2013.01); *G02B 2027/014* (2013.01); *G02B 2027/0127* (2013.01); *G02B 2027/0187* (2013.01)

(58) Field of Classification Search
CPC ............. G02B 27/017; G02B 27/0172; G02B 27/0178; G02B 2027/0185; G02B 2027/0134; G02B 2027/0138; G09G 3/003
USPC ........................................................ 345/4–8
See application file for complete search history.

(56) References Cited

U.S. PATENT DOCUMENTS

| | | | |
|---|---|---|---|
| 4,041,505 A | 8/1977 | Hartmann | |
| 4,274,101 A | 6/1981 | Kataoka et al. | |
| 4,680,802 A | 7/1987 | Nishida et al. | |
| 4,934,773 A | 6/1990 | Becker | |
| 5,307,170 A | 4/1994 | Itsumi et al. | |
| 5,416,876 A | 5/1995 | Ansley et al. | |
| 5,486,860 A | 1/1996 | Shiokawa et al. | |

(Continued)

FOREIGN PATENT DOCUMENTS

| | | |
|---|---|---|
| CN | 101268388 A | 9/2008 |
| CN | 101634750 A | 1/2010 |

(Continued)

OTHER PUBLICATIONS

Sheng Liu et al.: "A Novel Prototype for an Optical See-Through Head-Mounted Display with Addressable Focus Cues", IEEE Transactions on Visualization and Computer Graphics, IEEE Service Center, Los Alamitos, CA, US, vol. 16, No. 3, May 1, 2010, pp. 381-393, XP011344617, ISSN: 1077-2626, 001: 10.11 09/TVCG.2009.95.*

(Continued)

*Primary Examiner* — Adam R Giesy  
(74) *Attorney, Agent, or Firm* — Micah Goldsmith; Judy Yee; Micky Minhas

(57) ABSTRACT

An augmented reality system provides improved focus of real and virtual objects. A see-through display device includes a variable focus lens a user looks through. A focal region adjustment unit automatically focuses the variable focus lens in a current user focal region. A microdisplay assembly attached to the see-through display device generates a virtual object for display in the user's current focal region by adjusting its focal region. The variable focus lens may also be adjusted to provide one or more zoom features. Visual enhancement of an object may also be provided to improve a user's perception of an object.

13 Claims, 23 Drawing Sheets

(56) References Cited

U.S. PATENT DOCUMENTS

| | | | |
|---|---|---|---|
| 6,053,610 | A | 4/2000 | Kurtin et al. |
| 6,069,742 | A | 5/2000 | Silver |
| 6,317,127 | B1 | 11/2001 | Daily et al. |
| 6,351,335 | B1 | 2/2002 | Perlin |
| 6,408,257 | B1 | 6/2002 | Harrington et al. |
| 6,522,479 | B2 | 2/2003 | Yahagi |
| 6,618,208 | B1 | 9/2003 | Silver |
| 6,886,137 | B2 | 4/2005 | Peck et al. |
| 6,898,307 | B1 | 5/2005 | Harrington |
| 7,133,077 | B2 | 11/2006 | Higuma et al. |
| 7,262,926 | B2 | 8/2007 | Ohsato |
| 7,362,522 | B2 | 4/2008 | Ohsato |
| 7,457,434 | B2 | 11/2008 | Azar |
| 7,542,012 | B2 | 6/2009 | Kato et al. |
| 7,686,451 | B2 | 3/2010 | Cleveland |
| 8,262,234 | B2 | 9/2012 | Watanabe |
| 8,941,559 | B2 | 1/2015 | Bar-Zeev et al. |
| 2001/0001240 | A1 | 5/2001 | Melville et al. |
| 2002/0126066 | A1* | 9/2002 | Yasukawa et al. ............ 345/8 |
| 2002/0163486 | A1 | 11/2002 | Ronzani et al. |
| 2002/0167462 | A1 | 11/2002 | Lewis et al. |
| 2003/0197933 | A1* | 10/2003 | Sudo et al. ............ 359/464 |
| 2004/0130783 | A1 | 7/2004 | Solomon |
| 2005/0090730 | A1 | 4/2005 | Cortinovis et al. |
| 2006/0028400 | A1* | 2/2006 | Lapstun et al. ............ 345/8 |
| 2006/0033992 | A1 | 2/2006 | Solomon |
| 2006/0077121 | A1 | 4/2006 | Melville et al. |
| 2006/0146012 | A1 | 7/2006 | Arneson et al. |
| 2006/0250322 | A1 | 11/2006 | Hall et al. |
| 2006/0284790 | A1 | 12/2006 | Tegreene et al. |
| 2007/0041101 | A1 | 2/2007 | Goosey et al. |
| 2007/0273610 | A1 | 11/2007 | Baillot |
| 2008/0007689 | A1 | 1/2008 | Silver |
| 2008/0084532 | A1 | 4/2008 | Kurtin |
| 2008/0117289 | A1 | 5/2008 | Schowengerdt et al. |
| 2008/0181452 | A1 | 7/2008 | Kwon et al. |
| 2008/0285140 | A1 | 11/2008 | Amitai |
| 2009/0112469 | A1* | 4/2009 | Lapidot et al. ............ 701/213 |
| 2009/0295683 | A1 | 12/2009 | Pugh et al. |
| 2010/0097580 | A1* | 4/2010 | Yamamoto et al. ............ 353/69 |
| 2010/0103175 | A1 | 4/2010 | Okutomi et al. |
| 2010/0231706 | A1 | 9/2010 | Maguire, Jr. |
| 2010/0238161 | A1* | 9/2010 | Varga et al. ............ 345/419 |
| 2010/0289880 | A1 | 11/2010 | Moliton et al. |
| 2011/0018903 | A1* | 1/2011 | Lapstun et al. ............ 345/633 |
| 2011/0075257 | A1 | 3/2011 | Hua et al. |
| 2012/0105486 | A1 | 5/2012 | Lankford et al. |
| 2013/0107021 | A1 | 5/2013 | Maizels et al. |

FOREIGN PATENT DOCUMENTS

| | | |
|---|---|---|
| JP | H02262112 A | 10/1990 |
| JP | 2001078234 A | 3/2001 |
| JP | 2001197522 A | 7/2001 |
| JP | 2001215441 A | 8/2001 |
| JP | 2001242370 A | 9/2001 |
| JP | 2002176661 A | 6/2002 |
| JP | 2002199747 | 7/2002 |
| JP | 2002529792 A | 9/2002 |
| JP | 2003141522 | 5/2003 |
| JP | 2005208255 A | 8/2005 |
| JP | 2005351967 A | 12/2005 |
| JP | 3872100 B2 | 1/2007 |
| JP | 2008508621 A | 3/2008 |
| JP | 2008509438 A | 3/2008 |
| JP | 2010501890 A | 1/2010 |
| JP | 2010032759 A | 2/2010 |
| JP | 2010139575 | 6/2010 |
| JP | 2010139901 | 6/2010 |
| JP | 5237268 B2 | 7/2013 |
| KR | 1020030054603 | 7/2003 |
| KR | 100427649 B1 | 4/2004 |
| KR | 1020090053838 | 5/2009 |
| WO | 2006017771 A1 | 2/2006 |
| WO | 2006087709 A1 | 8/2006 |
| WO | 2007024482 A2 | 3/2007 |
| WO | 2007063306 A2 | 6/2007 |
| WO | 2008024071 A1 | 2/2008 |
| WO | 2009096325 A1 | 8/2009 |
| WO | 2010090144 A1 | 8/2010 |

OTHER PUBLICATIONS

Akeley et al. "A Stereo Display Prototype with Multiple Focal Distances," Proceedings of ACM SIGGRAPH, Aug. 2004, pp. 804-813. ACM, Inc: New York, NY, USA.

Blum, et al. "The Effect of Out-of-focus Blur on Visual Discomfort When Using Stereo Displays." Proceedings of the 2010 International Symposium on Mixed and Augmented Reality. Oct. 13-16, 2010, pp. 13-17. IEEE: Seoul, Korea.

Chen et al., "Research on Eye-gaze Tracking Network Generated by Augmented Reality Application," Proceedings of the Second International Workshop on Knowledge Discovery and Data Mining, Jan. 23-25, 2009, pp. 594-597. IEEE, Moscow, Russia.

"Helmet Mounted Display (HMD) with Built-In Eye Tracker." Datasheet. National Aerospace Laboratory (NLR), Jan. 2009, pp. 1-4. Retrieved from the Internet: URL: <http://www.nlr.nl/ATTS/flyer%20HMD%20F294-03.pdf>.

Hillaire et al. "Using an Eye-Tracking System to Improve Camera Motions and Depth-of-Field Blur Effects in Virtual Environments." Proceedings of the 2008 Virtual Reality Conference, Mar. 8-12, 2008, pp. 47-50. IEEE: Reno, NE, USA. Retrieved from the Internet Nov. 11, 2010, URL: <http://www.irisa.fr/bunraku/GENS/alecuyer/vr08_hillaire.pdf> 4 pages.

Johnson, Joel. "How Oil-Filled Lenses are Bringing Sight to Those in Need." Gizmodo [online]. Feb. 3, 2010, Gawker Media, New York, NY, USA. Retrieved from the Internet Nov. 11, 2010, URL: <http://gizmodo.com/5463368/how-oil+filled-lenses-are-bringing-sight-to-those-in-need> 4 pages.

Kim et al. "Vision-Based Eye-Gaze Tracking for Human Computer Interface." Proceedings of the 1999 Conference on Systems, Man, and Cybernetics, Oct. 12-15, 1999, pp. 324-329, vol. 2. IEEE: Toyko, Japan.

Kobayashi, et al. "Viewing and Reviewing How Humanoids Sensed, Planned and Behaved with Mixed Reality Technology." Proceedings of the 7th IEEE-RAX International Conference on Humanoid Robots, Nov. 29-Dec. 1, 2007, pp. 130-135. IEEE, Pittsburgh, PA, USA.

Lee et al. "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp. 700-709. Retrieved from the Internet: URL: <http://delivery.acm.org/10.1145/1770000/1769669/p700-lee.pdf?key1=1769669&key2=3272740821&coll=GUIDE&dl=GUIDE&CFID=98778950&CFTOKEN=13851951>.

Liu, Ruian, Shijiu Jin and Xiaorong Wu. "Real Time Auto-Focus Algorithm for Eye Gaze Tracking System." Proceedings of the 2007 International Symposium on Intelligent Signal Processing and Communication Systems. Nov. 28-Dec. 1, 2007, pp. 742-745, Xiamen, China.

Parviz, Babak A. "Augmented Reality in a Contact Lens." IEEE Spectrum: inside technology. Sep. 2009, pp. 1-14. Retrieved from the Internet on Jul. 29, 2010: URL: <http://spectrum.ieee.org/biomedical/bionics/augmented-reality-in-a-contact-lens>.

Ren, et al. "Tunable-focus liquid lens controlled using a servo motor." Optics Express, Sep. 4, 2006, pp. 8031-8036, vol. 14, No. 18. Optical Society of America: Washington, D.C., USA.

Rolland, Jannick and Hong Hua. "Displays—Head-Mounted." In Encyclopedia of Optical Engineering. New York: Marcel Dekker, 2005. Retrieved from the Internet on Nov. 11, 2010: URL: <http://www.optics.arizona.edu/opti588/reading/HMD_Rolland_Hua_2005.pdf> 16 pages.

Shachtman, Noah. "Pentagon: 'Augment' Reality with 'Videogame' Contact Lenses (Updated)." Wired [online]. Mar. 20, 2008, pp. 1-10. Retrieved from the Internet on Jul. 29, 2010: URL: <http://www.wired.com/dangerroom/2008/03/darpa-wants-con/>.

"Vibrating Lens Gives Movie Camera Great Depth of Focus." Popular Science. May 1942, pp. 88-89, vol. 140, No. 5. Popular Science Publishing Co., Inc.: New York, NY, USA. Retrieved from the

(56) References Cited

OTHER PUBLICATIONS

Internet on Sep. 29, 2000: URL: <http://books.google.com/> with search terms "vibrating" and "lens" 3 pages.
Office Action dated Mar. 14, 2013 in U.S. Appl. No. 12/941,825, 32 pages.
English abstract for KR1020030054603 published Jul. 2, 2003.
English abstract for KR1020090053838 published May 27, 2009.
International Search Report and Written Opinion dated Apr. 24, 2012 in International Patent Application No. PCT/US2011/059007, 8 pages.
International Preliminary Report on Patentability and Written Opinion dated May 21, 2013 in International Patent Application No. PCT/US2011/059007, 6 pages.
International Search Report and Written Opinion dated Apr. 24, 2012 in International Patent Application No. PCT/U52011/058604, 8 pages.
International Preliminary Report on Patentability and Written Opinion dated May 14, 2013 in International Patent Application No. PCT/US2011/058604, 6 pages.
U.S. Appl. No. 12/941,825, filed Nov. 8, 2010.
Response dated Sep. 16, 2013 to First Office action in U.S. Appl. No. 12/941,825, 21 pages.
Supplementary European Search Report dated Jul. 11, 2013 in European Patent Application No. 11842082.7, 3 pages.
English Abstract of CN101268388 published Sep. 17, 2008.
English Abstract of CN101634750 published Jan. 27, 2010.
First Office Action dated Sep. 18, 2013 in Chinese Patent Application No. 201110386149.4, 12 pages.
Communication pursuant to Article 94(3) EPC dated Sep. 12, 2013 in European Patent Application No. 11842082.7, 6 pages.
Office Action date Oct. 10, 2013 in U.S. Appl. No. 13/221,770, 41 pages.
Final Office Action dated Dec. 31, 2013 in U.S. Appl. No. 12/941,825, 26 pages.
Office Action dated Jan. 3, 2014, with partial English translation, in Chinese Patent Application No. 201110364954.7, 12 pages.
Response to Office Action filed Jan. 10, 2014 in U.S. Appl. No. 13/221,770, 12 pages.
Office Action dated Sep. 18, 2013 in Chinese Patent Application No. 201110386149.4, with partial English language translation and English Summary of the Office Action, 13 pages.
Response to Office Action filed Jan. 15, 2014 in European Patent Application No. 11842082.7, with Set of Claims and Description pages, 21 pages.
Response to Office Action filed Jan. 16, 2014 in Chinese Patent Application No. 201110386149.4, with Summary of the Response and English Translation of the Pending Claims, 9 pages.
Examination Report dated Mar. 10, 2014 in European Patent Application No. 118401645, 9 pages.
Sheng Liu et al: "A Novel Prototype for an Optical See-Through Head-Mounted Display with Addressable Focus Cues", IEEE Transactions on Visualization and Computer Graphics, IEEE Service Center, Los Alamitos, CA, US, vol. 16, No. 3, May 1, 2010, pp. 381-393, XP011344617, ISSN: 1077-2626, 001: 10.11 09/TVCG.2009.95.
Rolland J P. et al: "Dynamic Focusing in Head-Mounted Displays", Proceedings of SPIE, S PIE—International Society for Optical Engineering, US, vol. 3639, Jan. 25, 1999, pp. 463-470, XP008022044, ISSN: 0277-786X, 001: 10.1117/12.349412
Andrew K. Kirby et al: "Adaptive lenses based on polarization modulation", Proceedings of SPIE, vol. 6018, Dec. 9, 2005, pp. 601814-601814-5, XP055101928, ISSN: 0277-786X, 001: 10.1117/12.669373.
Anonymous: "Lens (optics)—From Wikipedia, the free encyclopedia", Oct. 18, 2010, pp. 1-6,.XP055102319, Retrieved from the Internet: URL:http://en.wikipedia.org/w/index.php?title=Lens_ (optics) &0ldid=391538808 [retrieved on Feb. 14, 2014].
Search Report dated Feb. 20, 2014 in European Patent Application No. 118401645, 3 pages.
Office Action dated Apr. 18, 2014 in U.S. Appl. No. 13/221,770, 22 pages.

Office Action dated Apr. 17, 2014 in Chinese Patent Application No. 201110386149.4 with partial English language translation and English Summary of the Office Action, 7 pages.
Response to Office Action dated Jun. 3, 2014 in U.S. Appl. No. 12/941,825, 17 pages.
Response to Office Action filed Jun. 9, 2014 in European Patent Application No. 118401645, 27 pages.
Response to Office Action filed May 13, 2014 in Chinese Patent Application No. 201110364954.7 with English Summary of the Response and English translation of the pending Claims, 7 pages.
English Abstract of KR100427649B1, published Apr. 28, 2004, 1 page.
Office Action Dated Aug. 6, 2014 in European Patent Application No. 11842082.7, 7 pages.
Response to Office Action filed Jun. 19, 2014 in Chinese Patent Application No. 201110386149.4, with Summary of the Response and English Translation of the Amended Claims, 13 pages.
Notice of Allowance dated Sep. 28, 2014 in Chinses Patent Application No. 201110386149.4, with partial English language translation and English Translation of the Allowed Claims, 8 pages.
Response to Office Action filed Sep. 19, 2014 in U.S. Appl. No. 13/221,770, 17 pages.
Office Action dated Jan. 26, 2015 in U.S. Appl. No. 13/221,770, 35 pages.
Response to Office Action filed Nov. 17, 2014 in Chinese Patent Application No. 201110364954.7 with English Summary of the Response and English translation of the pending Claims, 13 pages.
Response to Office Action filed Nov. 24, 2014 in European Patent Application No. 11842082.7, with Set of Claims and Description pages, 11 pages.
Office Action dated Sep. 2, 2014, with partial English translation, in Chinese Patent Application No. 201110364954.7, 7 pages.
Response to Office Action dated Sep. 30, 2015 in U.S. Appl. No. 13/221,770, 20 pages.
Response to Office Action dated Apr. 16, 2015 in U.S. Appl. No. 13/221,770, 17 pages.
Office Action dated May 14, 2015 in U.S. Appl. No. 12/941,825, 37 pages.
Final Office Action dated Jul. 24, 2015 in U.S. Appl. No. 13/221,770, 35 pages.
Response to Office Action dated Jul. 10, 2015 in U.S. Appl. No. 12/941,825, 17 pages.
Response to Office Action dated Jul. 13, 2015 with English translation of amendments in Taiwan Patent Application No. 100134409, 82 pages.
Office Action with English translation dated Aug. 18, 2015 in Japanese Patent Application No. 2013-538778, 11 pages.
Office Action with English translation dated Sep. 28, 2015 in Japanese Patent Application No. 2013-539871, 9 pages.
Notice of Allowance with English translation dated Jan. 27, 2015 in Chinese Patent Application No. 201110364954.7, 10 pages.
Office Action with English translation of search report dated Apr. 10, 2015 in Taiwan Patent Application No. 100134409, 12 pages.
Office Action with English translation dated Apr. 13, 2015 in Israel Patent Application No. 225874, 3 pages.
Office Action with English translation dated Apr. 13, 2015 in Israel Patent Application No. 225995, 3 pages.
Notice of Allowance dated Nov. 6, 2015 in U.S. Appl. No. 13/221,770, 12 pages.
Notice of Allowance dated Dec. 8, 2015 in U.S. Patent Appl. No. 12/941,825, 33 pages.
Response to Office Action with English translation of amended claims dated Nov. 16, 2015 in Japanese Patent Application No. 2013/538778, 12 pages.
Response to Office Action with English translation of amended claims dated Jan. 19, 2016 in Japanese Patent Application No. 2013/539871, 7 pages.
Notice of Allowance dated Feb. 23, 2016 in Japanese Patent Application No. 2013-539871, 3 pages.

* cited by examiner

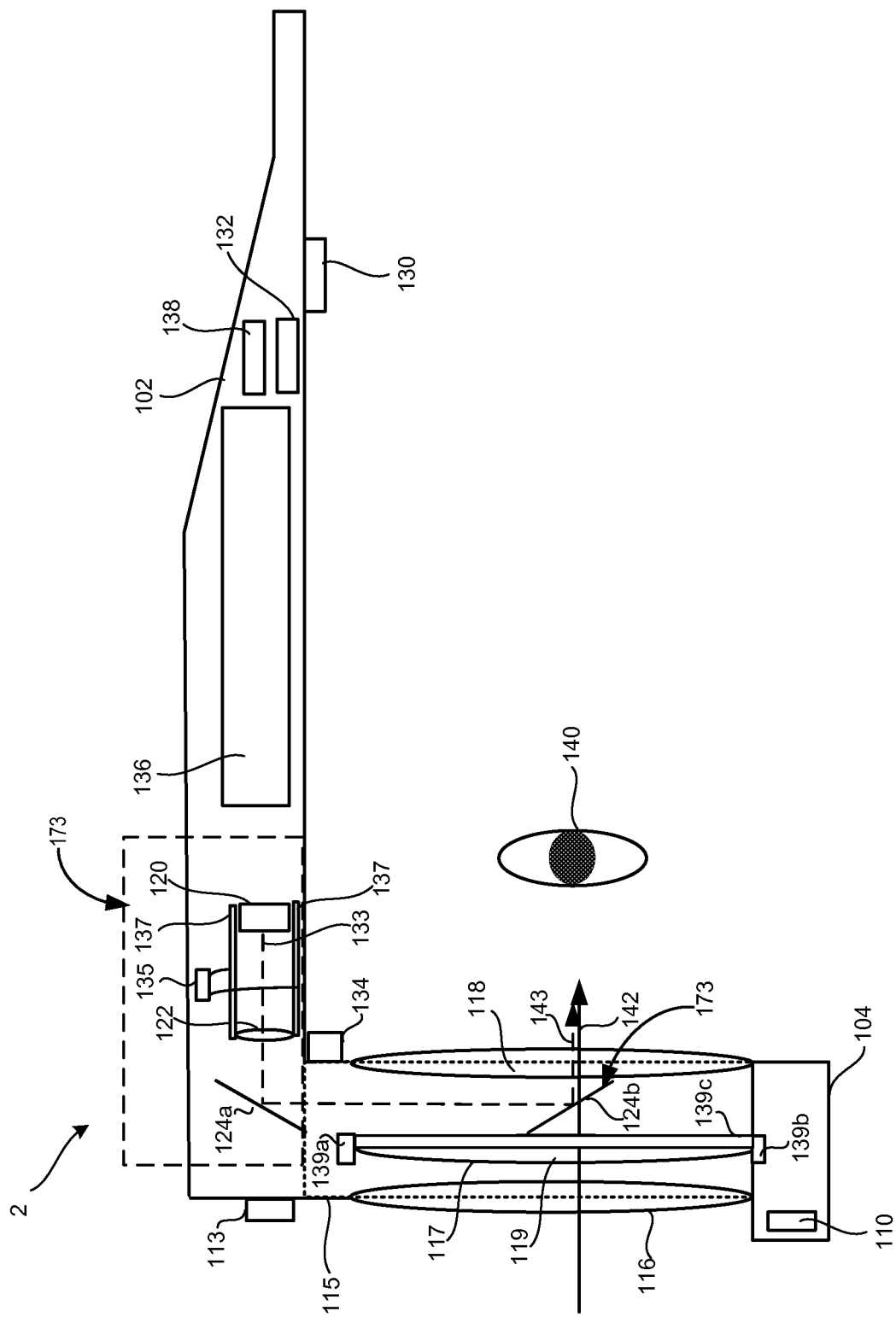

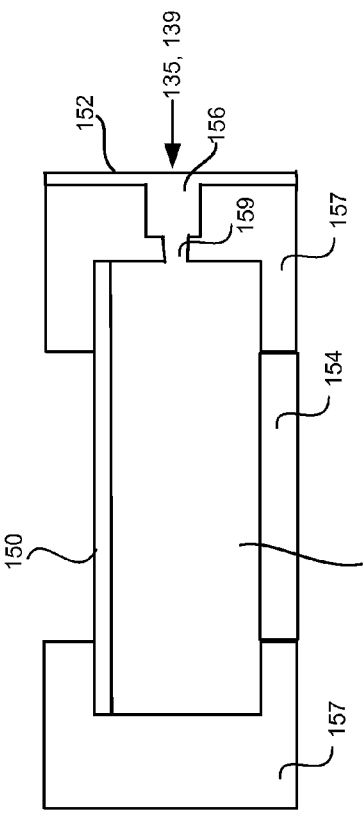
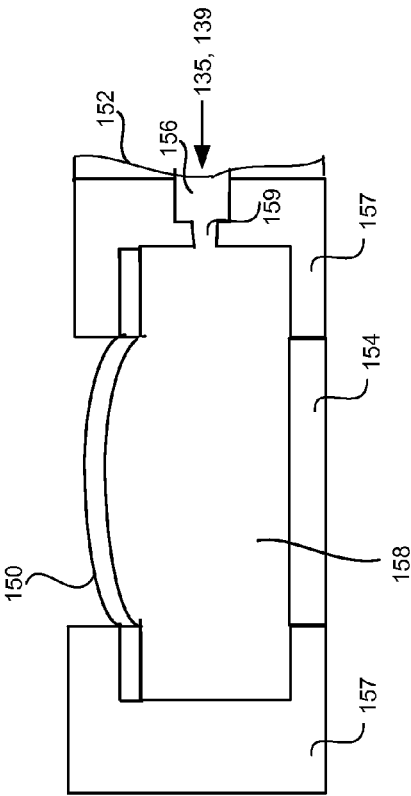
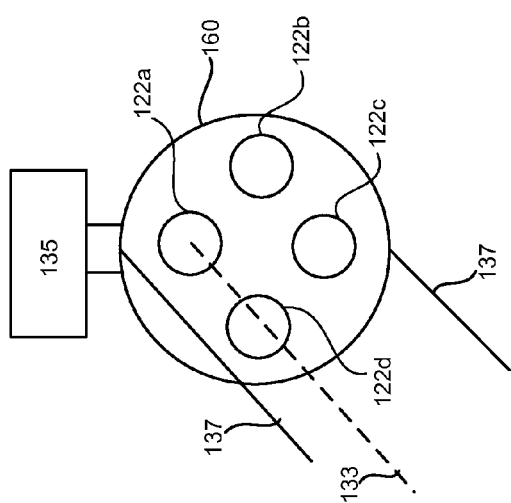
FIG. 2B1
FIG. 2B2
FIG. 2A

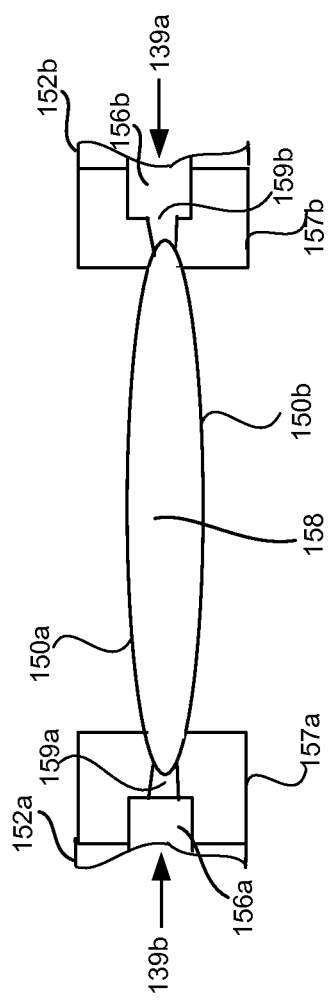
FIG. 2B3
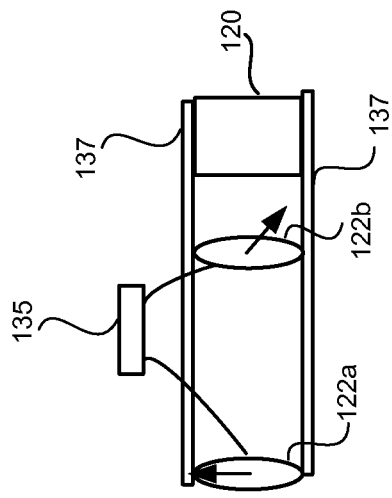
FIG. 2C

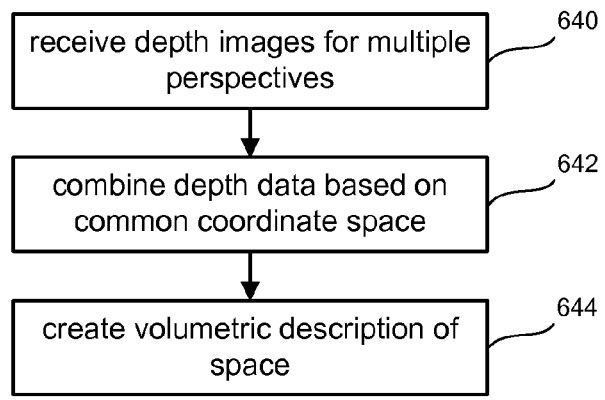
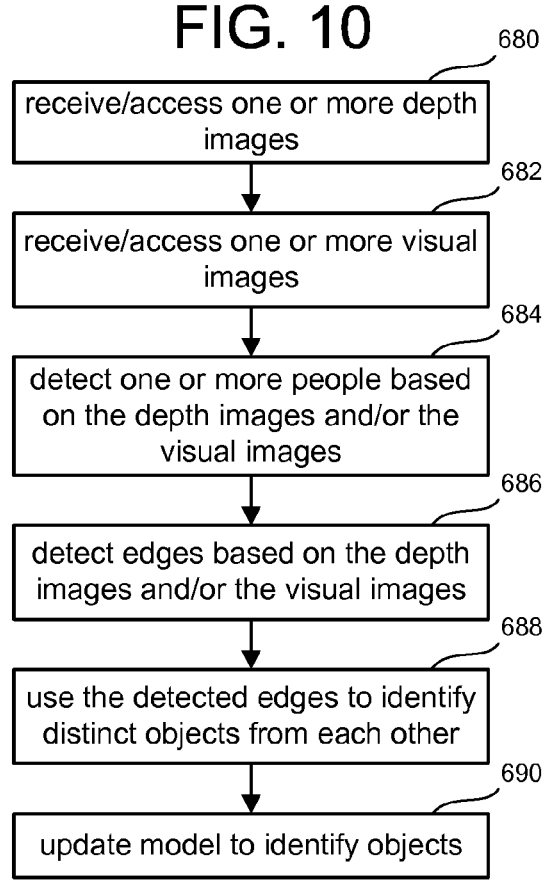

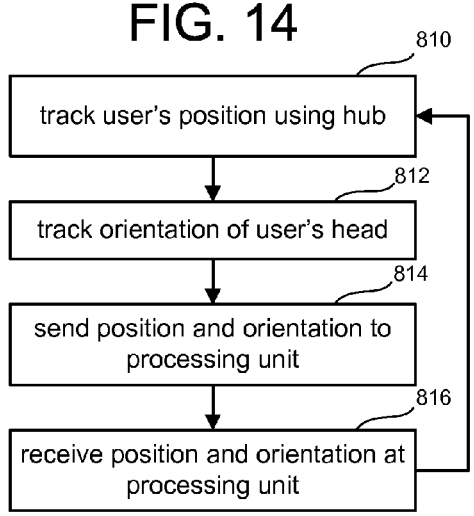
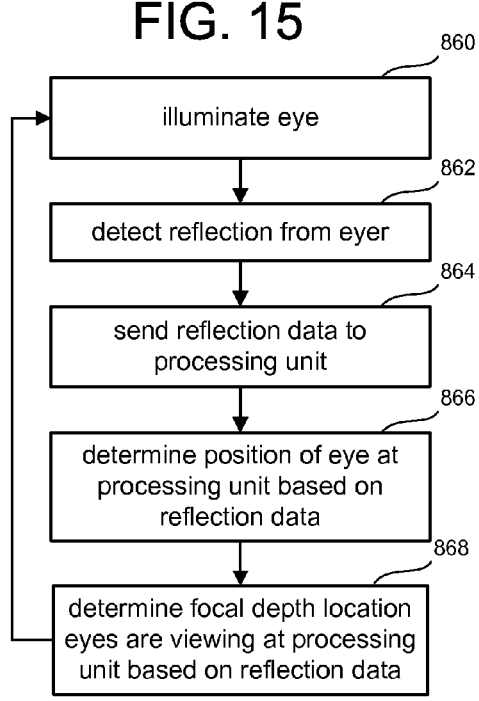
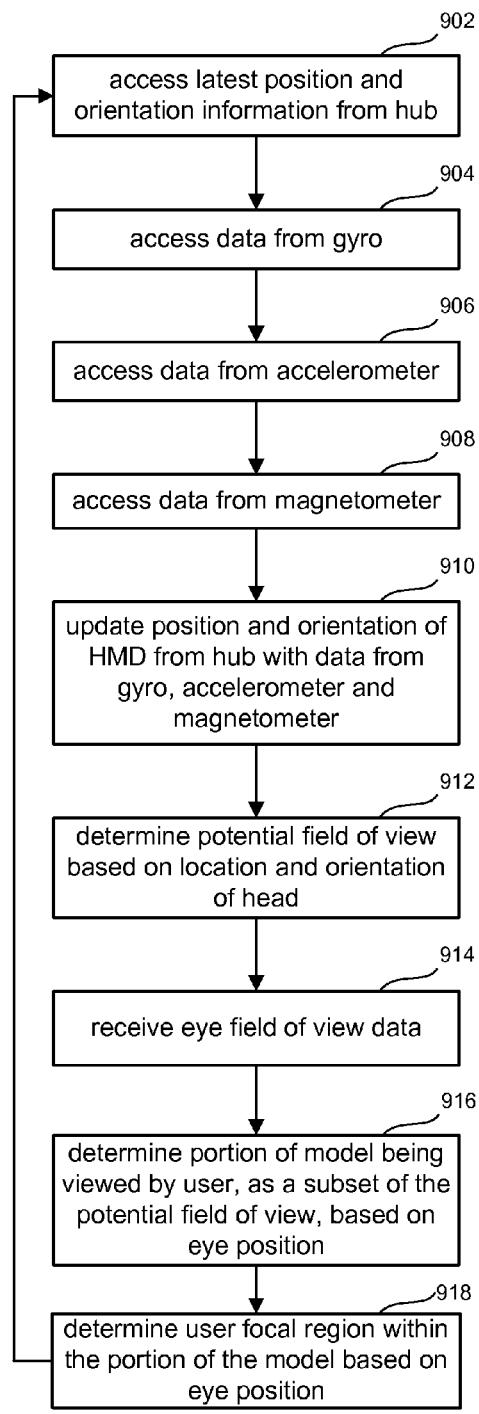

986 select a displacement value, S1, based on a target location of a virtual object and the equation $1/S_1 + 1/S_2 = 1/f$, with respect to a lens system including at least one birefringent lens and being located in an optical path between a microdisplay and a reflecting element

988 apply at least one drive signal to cause the variable focus adjuster to change the polarization of the at least one birefringent lens to change the focal length, f, of the birefringent lens to generate the selected S1 value

AUTOMATIC FOCUS IMPROVEMENT FOR AUGMENTED REALITY DISPLAYS

BACKGROUND

Augmented reality is a technology that allows virtual imagery to be mixed with a real world physical environment or space. Typically, near eye displays are worn by users to view the mixed imagery of virtual and real objects. The near-eye displays typically use a combination of optics and stereopsis to focus virtual imagery within the space. The ability to focus of a user can limit the user to seeing objects, both real and virtual, clearly in only a portion of the space, if at all.

SUMMARY

The technology provides embodiments for improving focus of objects for mixed reality or augmented reality displays. A user views a scene through a near-eye display device. The scene includes one or more real objects in a physical environment or space the user views directly with his or her eyes. In the case of a see-through display device, the user views real objects directly through clear or see-through lenses of the display device. One or more virtual objects are projected by the display device into at least one of the user's eye locations. Thus, the display of the real scene is augmented with virtual objects.

In an embodiment, the technology provides an augmented reality system comprising a see-through display device including a variable focus lens positioned to be seen through by a user. A virtual image is generated by a microdisplay assembly attached to the see-through display device. The virtual image is projected into the user's at least one eye, so the user sees both virtual and real objects when looking through the variable focus lens. One or more processors determine a current user focal region under the control of software stored in an accessible memory. The processor controls a focal region adjustment unit for focusing the variable focus lens in the current user focal region.

In another embodiment, the augmented reality system provides a zoom feature. The processor determines a focal distance based on a zoom feature and the current user focal region, and the focal region adjustment unit adjusts the variable focus lens based on the determined focal distance.

In another embodiment, the technology provides a method for providing improved focus of objects in an augmented reality system. A field of view of a user in a three dimensional model of a space including a real object is determined as is a current user focal region. A variable focus lens positioned to be seen through by a user is automatically adjusted for at least one eye to focus in the current user focal region. One or more virtual objects are displayed at a real world focal distance in a user field of view. An image of one of the objects in the user field of view is visually enhanced. In one example, a real object is visually enhanced.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a top view of a portion of an embodiment of a head mounted display device comprising a variable focus lens positioned to be seen through by a user.

FIG. 2A is an example of a rotatable lens system for use as part of a microdisplay assembly of a near-eye display.

FIG. 2B1 and FIG. 2B2 are examples of a liquid lens exhibiting different radii of curvature, the liquid lens being for use as part of a microdisplay assembly or as a see-through variable focus lens.

FIG. 2B3 is another example of a focal region adjustment unit which may be used for a liquid lens as part of a microdisplay assembly or as a see-through variable focus lens.

FIG. 2C is an example of a birefringent lens system for use as part of a microdisplay assembly of a near-eye display.

FIG. 3 is a block diagram of one embodiment of the components of a head mounted display unit.

FIG. 9 is a flow chart describing one embodiment of a process for creating a model of a space.

FIG. 10 is a flow chart describing one embodiment of a process for segmenting a model into objects.

FIG. 14 is a flow chart describing one embodiment of a process for the hub tracking the position and orientation of a user and/or the head mounted display unit.

FIG. 15 is a flow chart describing one embodiment of a process for tracking the position of an eye.

FIG. 16 is a flow chart describing one embodiment of a process for determining the field of view of a user and the focal region of a user.

FIG. 17B is a flowchart describing one embodiment of a process for changing a focal region of a microdisplay assembly by changing a polarization of at least one lens of the assembly.

DETAILED DESCRIPTION

Figure 1A:
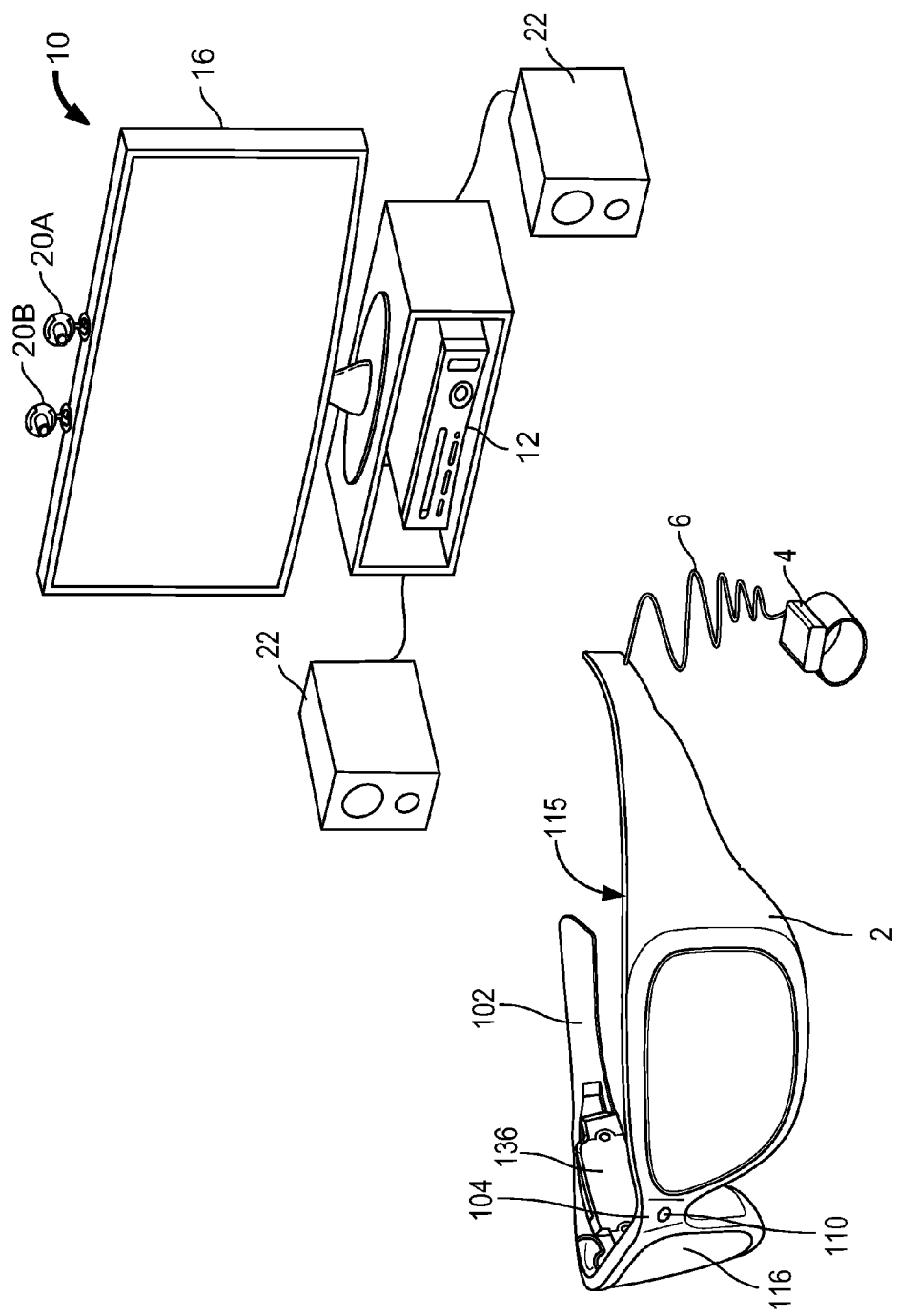
FIG. 1A is a block diagram depicting example components of one embodiment of the system for providing focus improvement in an augmented reality display.

The technology provides embodiments for achieving variable focus for mixed reality or augmented reality displays. In one embodiment, a system comprises a see-through display device as a near-eye display for augmented reality and a processing unit in communication with the see-through display device. In the embodiments discussed below, the see-through display is in a set of eyeglasses but other HMD formats and near-eye display holders can be used as well.

A user's natural sight is used to actually and directly view real objects in a scene viewed. In other words, the user sees the real word objects directly with the human eye. Based on the context of executing software, for example, a gaming application, the system can project virtual images on the display that are viewable by the person wearing the see-through display device while that person is also viewing real world objects through the display.

One or more sensors are used to scan the neighboring physical environment the user views thus providing data upon which a three-dimensional model of the scanned environment can be built. The model is segmented into real objects, and as explained below, is augmented with the locations of virtual object images.

Additionally, various sensors are used to detect position and orientation of the user's head and eye position in order to determine where to project the virtual images. The system automatically tracks where the user is looking so that the system can figure out the user's field of view through the display of the see-through display device. The user can be tracked using depth cameras and any of various sensors including depth sensors, image sensors, inertial sensors, eye position sensors, etc. Besides the user's field of view, the system also determines at what location in the field of view the user is focused or is looking at, referred to often as the user focal region.

In some embodiments, the user focal region is a volume known as the Panum's fusional area, in which the human eyes see objects with single vision. Humans have binocular vision or stereoptic vision. Each eye produces an image from a different point of view. Only in this small volume of the Panum's fusional area do humans see an object with single vision. This is generally what is meant when an object is said to be in focus. Outside this area, objects can appear blurry or even appear as double images. Within the center of the Panum's fusional area is a Horopter which includes the focal point of the user's eyes. When a user is focused on a point in space, hereafter the focal point, that focal point is located on a curved line. Objects on this curved line in space fall on the retinas of the eyes in the fovea. The curved line is sometimes referred to as the horizontal horopter. There is also a vertical horopter which is a line through the curved line which tilts away from the eyes above the focal point and towards the eyes below the focal point on the curve. The term Horopter as used hereafter refers to both of its vertical and horizontal components.

Once the system knows the user's field of view, and the user focal region, the system can figure out where one or more virtual object images should be projected by the display of the near-eye display device. A microdisplay assembly of the near-eye display device generates virtual objects within a user's field of view, and can place virtual objects in the user's focal region within the field of view.

Different users have different focal abilities at different focal distances which affects their visual acuity or clearness of vision. Many people have a refractive error resulting in difficulty focusing on objects at distances of several feet or more. These people are near-sighted. Particularly, as people age, they suffer from Presbyopia in which the eye's ability to focus on near objects declines for many as well. Hence, the need for reading glasses for many as they age. Ground, fixed focus eyeglasses are prescribed by an eye care professional to compensate for the refractive errors. A user can have a prescription lens in his or her near-eye display; however, this will typically be the distance prescription and not the reading glasses prescription so a user with Presbyopia will not be able to view near objects clearly. Additionally, prescriptions are not always up to date, particularly for children and adults over 40.

In some embodiments, a see-through display device includes a variable focus lens positioned to be seen through by the user. When the user is viewing real and virtual objects in a focal region, a focal region adjustment unit focuses the variable lens in the focal region. Thus, the user sees the real and virtual objects at that focal region in focus. In some embodiments, a variable focus lens may provide a zoom feature which allows a user the option of super or superior vision. An example of superior vision is being able to see farther than a person with normal vision, e.g. 20/20 or 6/6, can.

Virtual images may also be employed to enhance visibility or perception of objects, including real objects, to improve the user's ability to perceive or focus on the object.

FIG. 1A is a block diagram depicting example components of one embodiment of a system 10 for providing focus improvement in an augmented reality display. System 10 includes a see-through display device as a near-eye, head mounted display device 2 in communication with processing unit 4 via wire 6. In other embodiments, head mounted display device 2 communicates with processing unit 4 via wireless communication. Head mounted display device 2, which in one embodiment is in the shape of glasses in a frame 115, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is worn on the user's wrist and includes much of the computing power used to operate head mounted display device 2. Processing unit 4 communicates wirelessly (e.g., WiFi, Bluetooth, infra-red, or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the entire relevant space is viewed by the capture device.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers 22.

Hub computing device 10, with capture devices 20A and 20B, may be used to recognize, analyze, and/or track human (and other types of) targets. For example, a user wearing head mounted display device 2 may be tracked using the capture devices 20A and 20B such that the gestures and/or movements of the user may be captured to animate an avatar or on-screen character and/or may be interpreted as controls that may be used to affect the application being executed by hub computing system 12.

FIG. 1B depicts a top view of a portion of head mounted display device 2, including a portion of a frame 115 that includes temple 102 and nose bridge 104. Frame 115 provides a support for holding elements of the system in place as well as a conduit for electrical connections. Only the right side of head mounted display device 2 is depicted. Built into nose bridge 104 is a microphone 110 for recording sounds and transmitting that audio data to processing unit 4, as described below. At the front of head mounted display device 2 is physical environment facing video camera 113 that can capture video and still images. Those images are transmitted to processing unit 4, as described below.

In order to show the components of head mounted display device 2, a portion of the frame 115 is shown in dotted lines to expose the see-through lenses 116, 118 and 119 arranged therein and the elements 139*a*, 139*b*, 139*c* of a focal region adjustment unit 139 for the variable focus lens 119. Support element 139*c* may be made of a see-through material like glass or plastic. In this embodiment, frame 115 provides a convenient eyeglass frame as support for the elements of the system discussed further below. In other embodiments, other support structures can be used. An example of such a structure is a visor.

Lens 119 is a variable focus lens. An example of a variable focus lens is a liquid lens. In this example, the lens includes a flexible surface 117 which can change its shape. For example it may be made more convex, made straight, or more concave. In this example, see-through lenses 116 and 118 provide protection from factors in the physical environment like dust and being dropped to the liquid filled variable lens. Lens 116 and 118 may be standard lenses used in eye glasses and either or both may include a prescription. In other embodiments, the see-through device may include just one other standard lens or only the variable focus lens 119 likely enclosed within the frame 115 by glass or plastic as protection from environmental factors such as dust and falls. An example of a focal region adjustment unit 139 affecting the optical power or focal length of a liquid lens embodiment by affecting the radius of curvature is illustrated below in FIGS. 2B1 and 2B2. The optical power of a lens is defined as the reciprocal of its focal length, e.g. 1/focal length so a change in one effects the other. In one example, lens 119 may be made of a clear film such as a version of Mylar®, and the liquid may be a silicone oil such as Dow-Corning DC-703 or DC-705.

A microdisplay assembly 173 comprises light processing elements and a variable focus adjuster 135. An example of light processing element is a microdisplay unit 120. Other examples include one or more optical elements such as one or more lenses of a lens system 122 and one or more reflecting elements such as surfaces 124*a* and 124*b*. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surfaces 124*a* and 124*b*. The optical alignment may be along an optical axis 133 or an optical path 133 including one or more optical axes. The microdisplay unit 120 projects the image of the virtual object through lens system 122, which may direct the image light, onto reflecting element 124*a* (e.g. a mirror or other surface) which directs the light of the virtual image to a partially reflecting element 124*b* which combines the virtual image view 143 with the natural or actual and direct view 142. The combination of views are directed into a user's eye 140.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement as discussed in the examples of FIGS. 2A through 2D below.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 1B), which will include an eye tracking illumination device 134A and eye tracking camera 134B (see FIG. 3). In one embodiment, eye tracking illumination source 134A includes one or more infrared (IR) emitters, which emit IR light toward the eye. Eye tracking camera 134B includes one or more cameras that sense the reflected IR light.

The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the system will use four infrared (IR) LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared imaging device on the side of the lens of head mounted display device 2. The imaging device will use a small mirror and/or lens (fish eye) such that the imaging device can image up to 75% of the visible eye from the glasses frame. The imaging device will then sense an image and use computer vision to find the pupil direction, much like as discussed above. Thus, although FIG. 1B shows one assembly with one IR emitter, the structure of FIG. 1B can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

Control circuits 136 provide various electronics that support the other components of head mounted display device 2. More details of control circuits 136 are provided below with respect to FIG. 3. Inside, or mounted to temple 102, are ear phones 130, inertial sensors 132 and temperature sensor 138. In one embodiment inertial sensors 132 include a three axis magnetometer 132A, three axis gyro 132B and three axis accelerometer 132C (See FIG. 3). The inertial sensors are for sensing position, orientation, sudden accelerations of head mounted display device 2.

FIG. 1B only shows half of the head mounted display device 2. A full head mounted display device would include another set of see through lenses 116 and 118, another variable focus lens 119, another micro display 120, another lens system 122, room facing camera 113, eye tracking assembly 134, earphones 130, and temperature sensor 138.

Figure 1C:
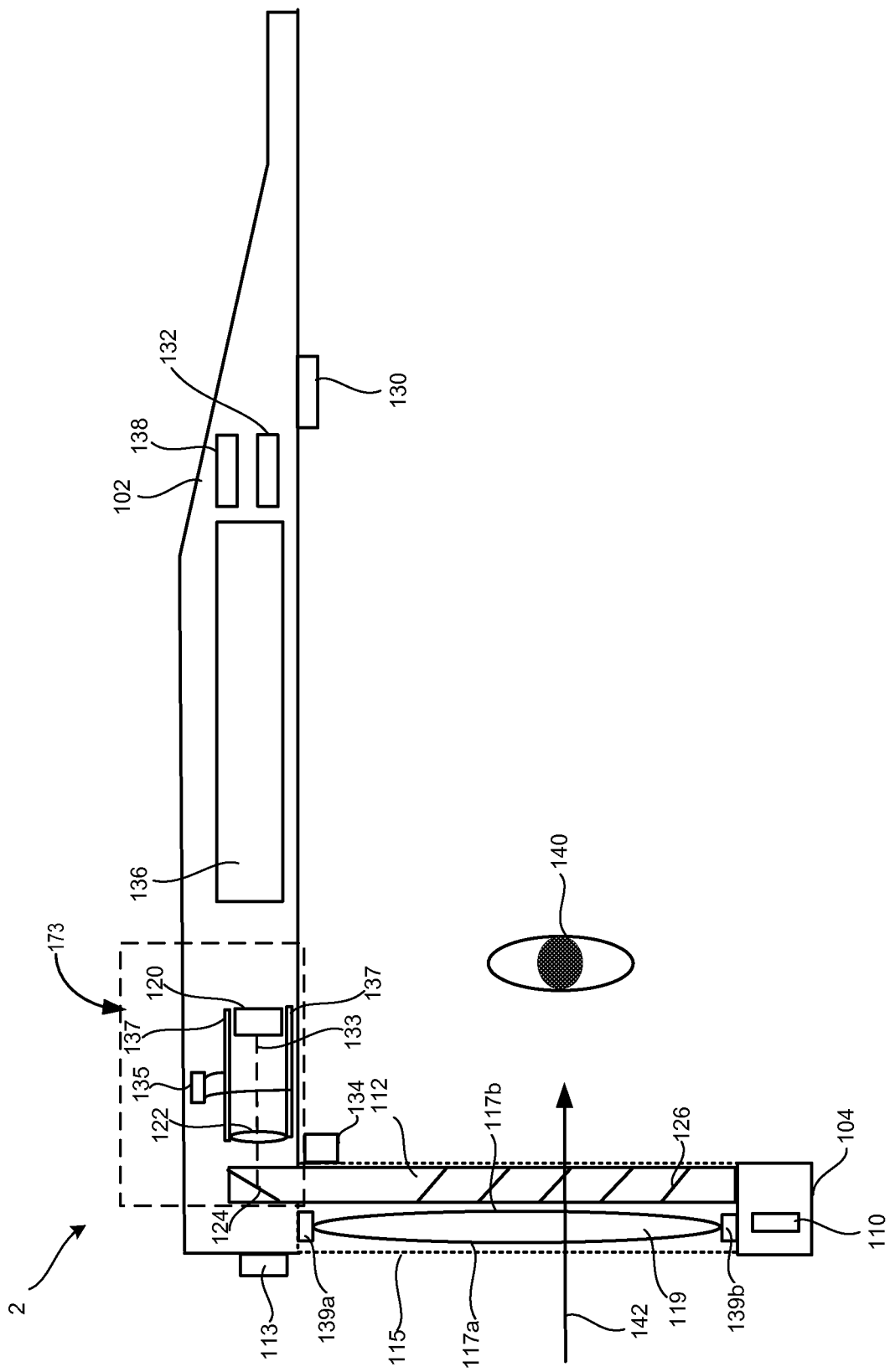
FIG. 1C is a top view of a portion of another embodiment of a head mounted display device comprising a variable focus lens positioned to be seen through by a user.

FIG. 1C is a top view of a portion of another embodiment of a head mounted display device comprising a variable focus lens positioned to be seen through by a user. In this example, variable focus lens 119 is a liquid lens. In this embodiment, a reflecting element 124 guides the image into a lightguide optical element 112. Lightguide optical element 112 transmits light from microdisplay 120 to the eye 140 of the user wearing head mounted display device 2. Lightguide optical element 112 also allows light from in front of the head mounted display device 2 to be transmitted through lightguide optical element 112 to eye 140, as depicted by arrow 142, thereby allowing the user to have an actual direct view of the space in front of head mounted display device 2 in addition to receiving a virtual image from microdisplay 120. Thus, the walls of lightguide optical element 112 are see-through.

Lightguide optical element 112 includes the reflecting surface 124. Light from microdisplay 120 passes through lens system 122 and becomes incident on reflecting surface 124. The reflecting surface 124 reflects the incident light from the microdisplay 120 such that light is trapped inside a planar, substrate comprising lightguide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112. When the head mounted display device has two light guide optical elements, each eye can have its own microdisplay 120 that can display the same image in both eyes or different images in the two eyes. In another embodiment, there can be one lightguide optical element which reflects light into both eyes.

In this example, lens 119 has a flexible membrane 117a, 117b on both sides. As discussed further in the example of FIG. 2B3, the focal region adjustment units 139a, 139b may have reservoirs and may be used as pumps to fill and remove liquid from the lens 119.

FIG. 1C only shows half of the head mounted display device 2. A full head mounted display device would include another variable focus lens 119, another lightguide optical element 112, another micro display 120, another lens system 122, room facing camera 113, eye tracking assembly 134, earphones 130, and temperature sensor 138.

FIGS. 2A through 2D illustrate different embodiments of microdisplay assemblies. Before discussing the particulars of each embodiment, a discussion of changing focal distance is provided. As mentioned above, the configuration of the light processing elements of the microdisplay assembly 173 create a focal distance or focal region in which a virtual object appears in an image. Changing the configuration changes the focal region for the virtual object image. The focal region determined by the light processing elements can be determined and changed based on the equation $1/S_1 + 1/S_2 = 1/f$.

The symbol f represents the focal length of a lens such as lens system 122 in the microdisplay assembly 173. The lens system 122 has a front nodal point and a rear nodal point. If light rays are directed toward either nodal point at a given angle relative to the optical axis, the light rays will emerge from the other nodal point at an equivalent angle relative to the optical axis. In one example, the rear nodal point of lens system 122 would be between itself and the microdisplay 120 in FIG. 1C or in FIG. 1B. The distance from the rear nodal point to the microdisplay 120 may be denoted as $S_2$. The front nodal point is typically within a few mm of lens system 122. The target location is the location of the virtual image to be generated by the microdisplay 120 in a three-dimensional model of the user's physical space. (See discussion of FIGS. 9-11A below for more details about creating the model.) The distance from the front nodal point to the target location of the virtual image may be denoted as $S_1$. Since the image is to be a virtual image appearing on the same side of the lens as the microdisplay 120, sign conventions give that $S_1$ has a negative value.

If the focal length of the lens is fixed, $S_1$ and $S_2$ are varied to focus virtual objects at different depths. For example, an initial position may have $S_1$ set to infinity, and $S_2$ equal to the focal length of lens system 122. Assuming lens system 122 has a focal length of 10 mm, consider an example in which the virtual object is to be placed about 1 foot or 300 mm into the user's field of view. $S_1$ is now about −300 mm, f is 10 mm and $S_2$ is set currently at the initial position of the focal length, 10 mm, meaning the rear nodal point of lens system 122 is 10 mm from the microdisplay 120. The new distance or new displacement between the lens 122 and microdisplay 120 is determined based on $1/(-300) + 1/S_2 = 1/10$ with all in units of mm. The result is about 9.67 mm for $S_2$.

In one example, the processing unit 4 can calculate the displacement values for $S_1$ and $S_2$, leaving the focal length f fixed and cause the control circuitry 136 to cause a variable adjuster driver 237 (see FIG. 3) to send drive signals to have the variable virtual focus adjuster 135 move the lens system 122 along the optical path 133 for example. In other embodiments, the microdisplay unit 120 may be moved instead or in addition to moving the lens system 122.

In other embodiments, the focal length of at least one lens in the lens system 122 may be changed instead or with changes in the displacement along the optical path 133 as well. Some embodiments of microdisplay assemblies are illustrated in FIGS. 2A through 2D. The specific number of lenses shown are just examples. Other numbers and configurations of lenses operating on the same principles may be used. Furthermore, as mentioned above, the discussion of the adjustable liquid lens is applicable to both such a lens used in the microdisplay assembly for placing virtual objects in focus and as a see-through variable focus lens for bringing real objects in focus in an augmented reality display.

FIG. 2A is an example of a rotatable lens system for use as part of a microdisplay assembly of a near-eye display. Each of the lenses 122a through 122d has a different focal length and are supported within a disk support 160 rotable by the variable virtual focus adjuster 135. The processing unit 4 determines a focal region and selects one of the focal length lenses to obtain that focal region. As shown with respect of FIG. 3, a variable adjuster driver 237 of the control circuitry 136 sends at least one control signal to the variable virtual focus adjuster 135 to rotate the disk so the selected lens is aligned in the optical path 133 of the assembly.

FIG. 2B1 and FIG. 2B2 are examples of a liquid lens 158 exhibiting different radii of curvature as shown in Hongwen et al., *Tunable-focus liquid lens controlled using a servo motor*, OPTICS EXPRESS, 4 Sep. 2006, Vol. 14, No. 18, pp. 8031-8036. The liquid lens can be used as part of a microdisplay assembly or a see-through display lens. The focal length of the lens may be changed by changing the radius of curvature. The relationship between radius of curvature, R, and a focal length, f, is given by $f=R/n_{liquid}-1$. The refractive index of the liquid or liquid of the lens is $n_{liquid}$.

This embodiment comprises a support 157, for example a sealing ring having a flexible external membrane 152, in one example a rubber membrane, as a portion or connected to it. The external membrane 152 is in contact with a reservoir of liquid 156. A lens membrane 150 rests on top of or forms a flexible side of a liquid lens 158 which can receive from and release liquid into the reservoir 156 through a channel 159. In the cited example, the flexible lens membrane 150 is an elastic membrane such as polydimethylsiloxane (PDMS) elastomeric membrane. Glass plate 154 behind the liquid cell provides support. The pushing and releasing of membrane 152 causes the volume of water in the reservoir 156 to go into and out of the liquid lens 158 via the channel 159, thus convexing the elastic membrane 150 and relaxing the elastic membrane 150 due to the volume of liquid changes. Changes in the volume of liquid cause changes in the radius of curvature of the lens membrane 150 and thus in the focal length of the liquid lens 158. They relationship between the radius of curvature and the change in volume ΔV may be expressed as follows:

$$\Delta V=(1/3)\pi(2R^2-r_0^2-2R\sqrt{R^2-r_0^2})(2R+\sqrt{R^2-r_0^2})$$

where $r_0$ is the radius of the lens aperture.

In the example of the microdisplay assembly 173 when the lens 122 is a variable focus lens, the armature 137 may provide the support structure 157 with or without the glass plate 154 as well as a flexible membrane portion 152 for the variable virtual focus adjuster 135 as controlled by control circuitry 136 to push against as shown in FIG. 2B2 and release (see FIG. 2B1). Similarly, in the example of the see-through variable lens 119 being analogous to liquid lens 158 and its flexible surfaces 117 being analogous to membrane 150, support element 139*c* is analogous to support structure 157 with or without the glass plate 154. Each of the side supports 139*a*, 139*b* are analogous to the side walls 157. One or both of the side supports 139*a*, 139*b* may include a reservoir 156 and a flexible external membrane 152 which can be pushed and released against the reservoir 156 under the control of a driver of the control circuitry 136. In other embodiments the channel 159 can be open and closed to adjust the volume of the liquid. Furthermore, pumps may be used instead of the flexible external membrane 152.

FIGS. 2B1 and 2B2 provide examples of adjusting the optical power of a variable focus liquid lens by mechanical adjustment. Other ways of adjusting the liquid lens may also be used. For example, electro-wetting may also be used to change the optical power of a liquid lens. See US2008/0117289 Schowengerdt et al. entitled Variable Fixation Viewing Distance Scanned Light Displays.

Figure 2D:
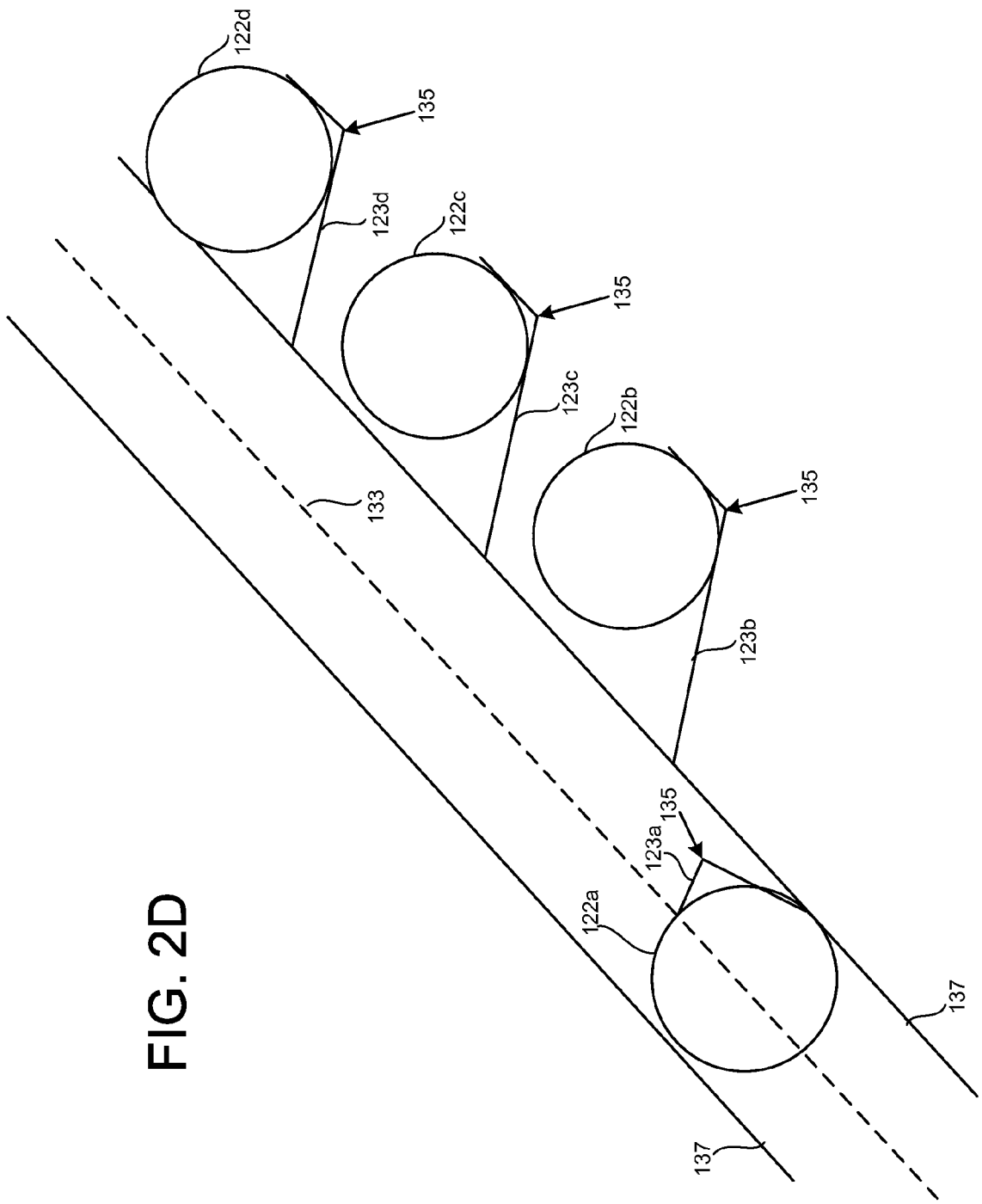
FIG. 2D is an example of an insertable lens system for use as part of a microdisplay assembly.
Figure 3:
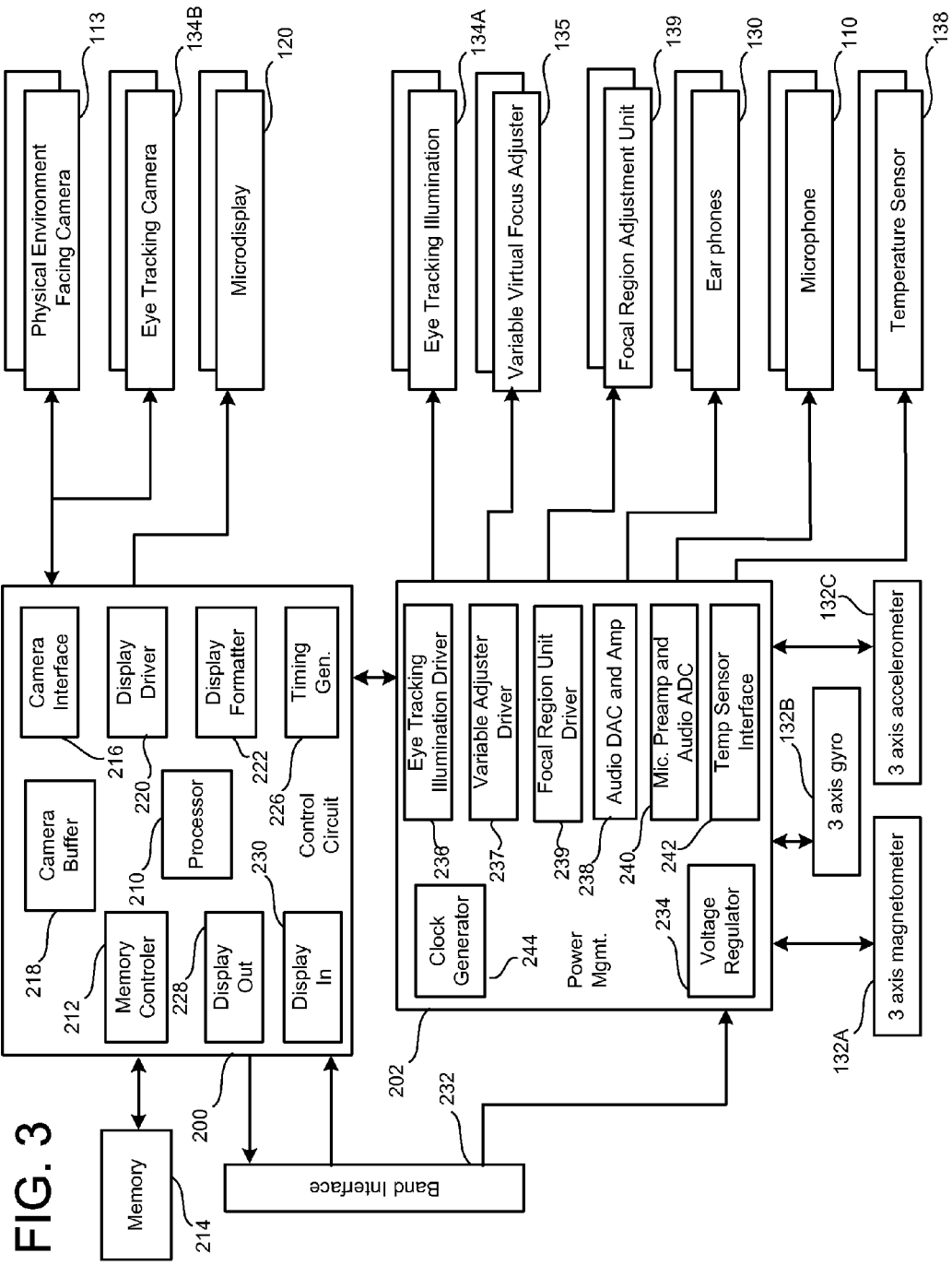

FIG. 2B3 is another example of a focal region adjustment unit which may be used for a liquid lens as part of a microdisplay assembly or as a see-through variable focus lens. The lens 158 is arranged like variable focus lens 119 in FIG. 1C in which both sides of the lens have flexible membranes 150*a* and 150*b* like 117*a* and 117*b*. The focal region adjustment units 139*a* and 139*b* can each include a support 157*a*, 157*b*, a reservoir 156*a*, 156*b*, a channel 159*a*, 159*b* and an external flexible membrane 152*a*, 152*b* which an actuator or motor such as a piezo-electric actuator or motor can push and release under the control of a focal region unit driver 239. In other embodiments, the channels 159*a* and 159*b* may also be opened and closed and work with pumps to control the liquid volume in the lens 119.

FIG. 2C is an example of a birefringent lens system for use as part of a microdisplay assembly of a near-eye display. A birefringent material is anisotropic or directionally dependent. Describing light as a ray as an illustrative construct, a birefringent lens decomposes light into an ordinary ray and an extraordinary ray. For a single axis of anisotropy or optical axis, different refractive indices, and therefore different focal lengths, can exist for different polarizations, one parallel and one perpendicular to the axis. In the example of FIG. 2C, lenses 122*a* and 122*b* are lenses made of a birefringent material with different polarizations as indicated by the arrows. In this example of two lenses, four different refractive indices or focal lengths can be predetermined for selection. Each different focal length can be associated with a different focal region for selection by the processing unit 4. The polarization combinations can be perpendicular polarizations for lenses 122*a* and 122*b* as shown in FIG. 2C, the opposite perpendicular polarizations to those shown in FIG. 2C, the two lenses having the same polarizations in one direction, and the two lenses have the same polarizations in the other direction of polarization. The variable virtual focus adjuster may apply a voltage to each lens to effect a selected polarization in one embodiment. In another embodiment, a physical stress may be applied to change the polarization of a lens.

FIG. 2D is an example of an insertable lens system for use as part of a microdisplay assembly. In this embodiment, each of a number of lenses 122 is attached to a respective arm 123 attached to the armature 137. Each arm 123 moves its one or more optical elements 122, for example a lens or lens system 122, in position at a displacement in the optical path 133 of the microdisplay assembly under the control of the variable virtual focus adjuster 135. For example, if predetermined displacements for preset focal regions are being used, each lens 122 can be set a certain distance apart from its neighbors, for example 0.1 millimeters (mm) apart. Non-uniform spacing and adjustable displacements can also be used. Alternatively, the focal length of each inserted element can be chosen to affect the desired virtual image distance.

In each of the examples above adjusting the focal length of a lens, displacement along the optical path 133 may also be performed.

The processing of the microdisplay assembly and the focal region adjustment unit may be performed for each eye for the perspective of the respective eye so the virtual image appears in the user's current focal region, e.g. the Panum's fusional area, the area of single vision for humans.

Figure 4:
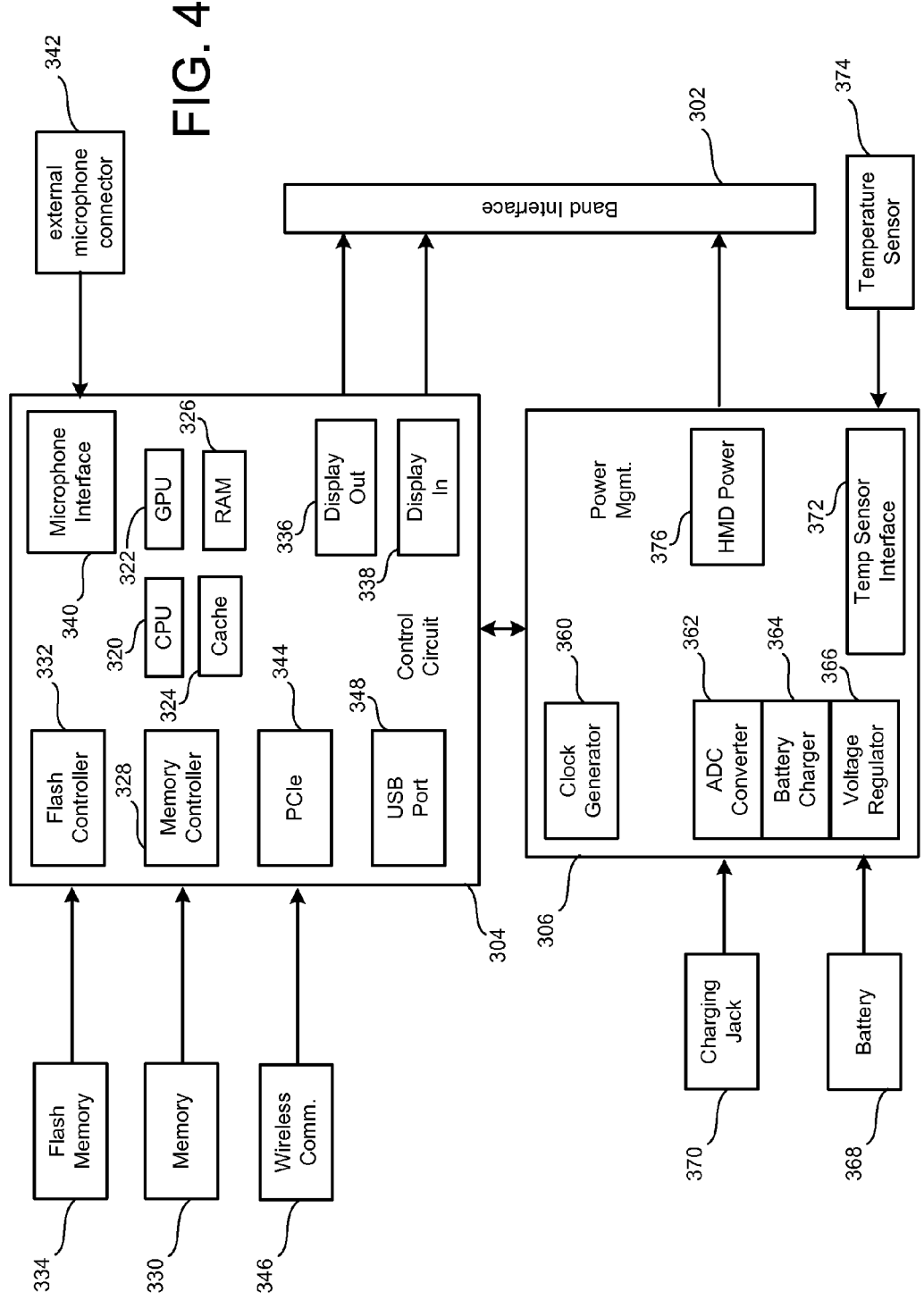
FIG. 4 is a block diagram of one embodiment of the components of a processing unit associated with a head mounted display unit.

FIG. 3 is a block diagram depicting the various components of head mounted display device 2. FIG. 4 is a block diagram describing the various components of processing unit 4. Head mounted display device 2, the components of which are depicted in FIG. 3, are used to provide a virtual image in-focus with the user's view of the real world. Additionally, the head mounted display device components of FIG. 3 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and also from hub computing device 12 (See FIG. 1). Based on that information, processing unit 4 will determine where and when to provide an in-focus virtual image to the user and send instructions accordingly to the head mounted display device of FIG. 3.

Note that some of the components of FIG. 3 (e.g., physical environment facing camera 113, eye tracking camera 134B, variable virtual focus adjuster 135, focal region adjustment unit 139, micro display 120, eye tracking illumination 134A, earphones 130, and temperature sensor 138) are shown in shadow to indicate that there are two of each of those devices, one for the left side and one for the right side of head mounted display device 2. FIG. 3 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210. Camera interface 216 provides an interface to the two physical environment facing cameras 113 and stores images received from the physical environment facing cameras in camera buffer 218. Display driver 220 will drive microdisplay 120. Display formatter 222 may provide information, about the virtual image being displayed on microdisplay 120 to one or more processors of one or more computer systems, e.g. 4, 12, 210 performing processing for the augmented reality system. Timing generator 226 is used to provide timing data for the system. Display out 228 is a buffer for providing images from physical environment facing cameras 113 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, variable adjuster driver 237, focal region unit driver 239, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR lightsource for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three axis magnetometer 132A, three axis gyro 132B and three axis accelerometer 132C.

The variable adjuster driver 237 provides a control signal, for example a drive current or a drive voltage, to the adjuster 135 to move one or more elements of the microdisplay assembly to achieve a displacement for a focal region calculated by software executing in the processing unit 4 or the hub computer 12 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The focal region unit driver 239 provides a control signal, for example, a driver current or a drive voltage to the focal region adjustment unit 139, in a mechanical adjustment example, to move one or more elements of the unit 139 to change the optical power of the variable focus lens 119 based on an adjustment value calculated by software executing in the processing unit 4 or the hub computer 12 or both. For example, a flexible membrane 152 of one of the side supports 139a, 139b including the reservoir 156 and channel 159 to the liquid in the lens 119 may be pushed or released by an actuator such as a piezo-electric actuator responding to the drive signal from the focal region unit driver 239.

FIG. 4 is a block diagram describing the various components of processing unit 4. FIG. 4 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication component 346 can include a Wi-Fi enabled communication device, Bluetooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power interface 376 provides power to the head mounted display device 2.

The above-described system will be configured to insert a virtual image into the field of view of a user so that the virtual image appears naturally in-focus or out-of-focus to the user. In various embodiments, the virtual image will be adjusted to match the appropriate orientation, size and shape based on the environment for which the image is being inserted into. In one embodiment, head mounted display device 2, processing unit 4 and hub computing device 12 work together as each of the devices includes a subset of sensors that are used to obtain the data for determining where, when and how to insert the virtual images. In one embodiment, the calculations that determine where, how and when to insert a virtual image are performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 2.

In one example embodiment, hub computing device 12 will create a model of the environment that the user is in and track various moving objects in that environment. In addition, hub computing device 12 tracks the field of view of the head mounted display device 2 by tracking the position and orientation of head mounted display device 2. The model and the tracking information is provided from hub computing device 12 to processing unit 4. Sensor information obtained by head mounted display device 2 is transmitted to processing unit 4. Processing unit 4 then uses additional sensor information it receives from head mounted display device 2 to refine the field of view of the user and provide instructions to head mounted display device 2 on how, where and when to insert the virtual image.

Figure 5:
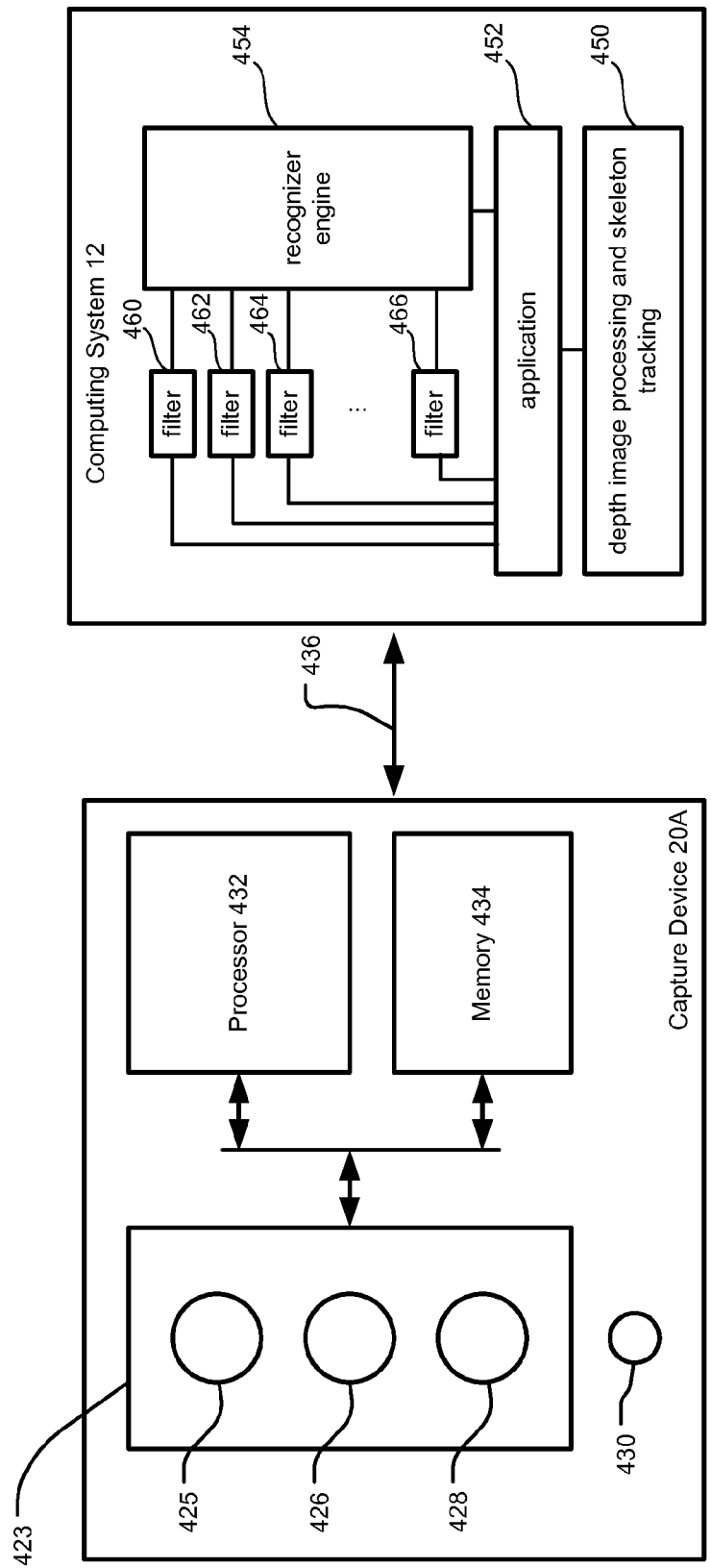
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A.

According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by to hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 452, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality for solving particular instances of gesture recognition.

Filters 460, 462, 464, . . . , 466 are loaded and implemented on top of the recognizer engine 454 and can utilize services provided by recognizer engine 454 to all filters 460, 462, 464, 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

Figure 6:
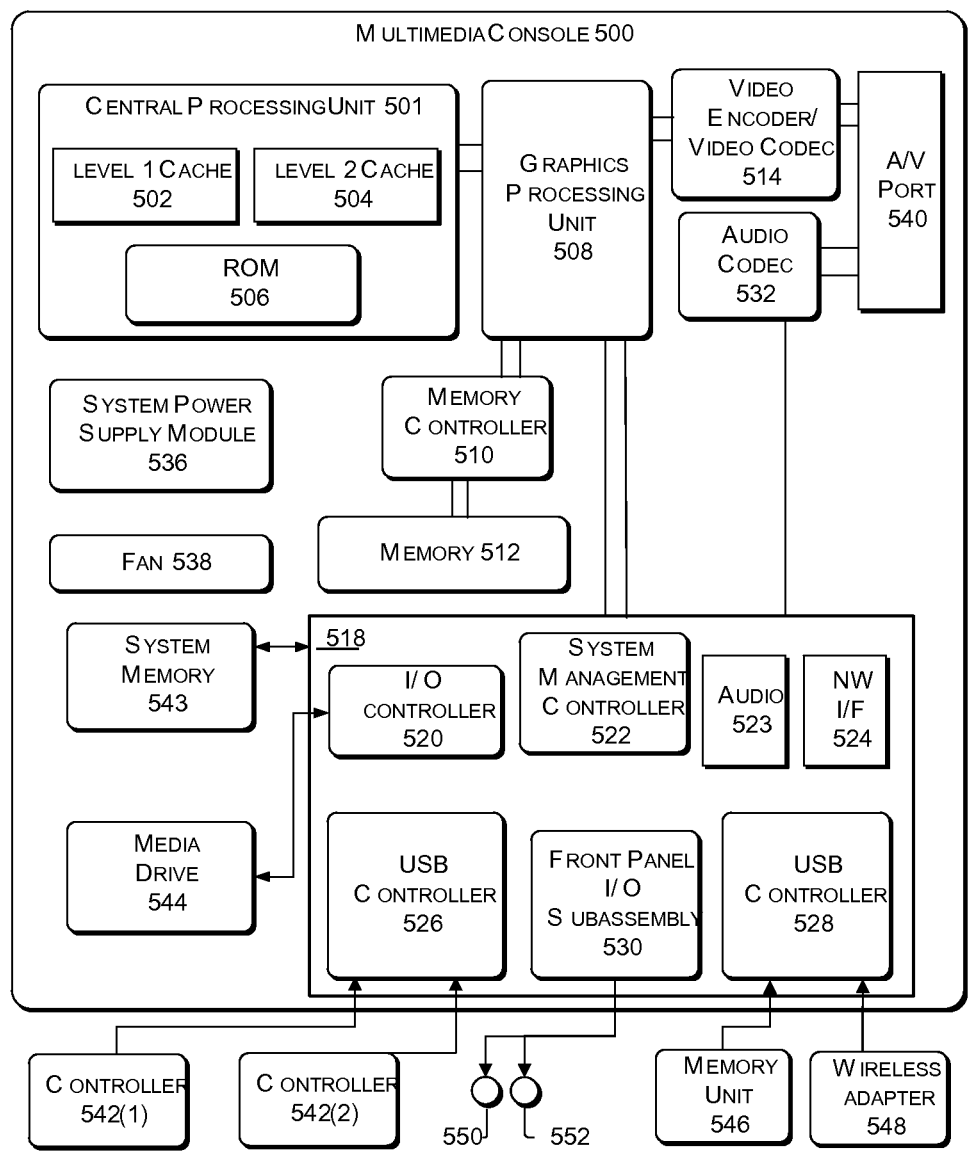
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface controller 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of, broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

The example computer systems illustrated in FIGS. 3, 4, 5 and 6 include examples of computer readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, memory sticks or cards, magnetic cassettes, magnetic tape, magnetic disk storage or other magnetic storage devices, or any other medium which can be used to store the desired information and which can accessed by a computer. Some examples of computer readable storage media in the figures include memory 214 of FIG. 3, flash memory 334, memory 330, RAM 326 and cache 324 of FIG. 4, memory 434 of FIG. 5, and ROM 506, caches 502, 504, memory 512, system memory 543, memory unit 546 and media drive 544 of FIG. 6.

FIG. 1A depicts one head mounted display device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

Figure 7:
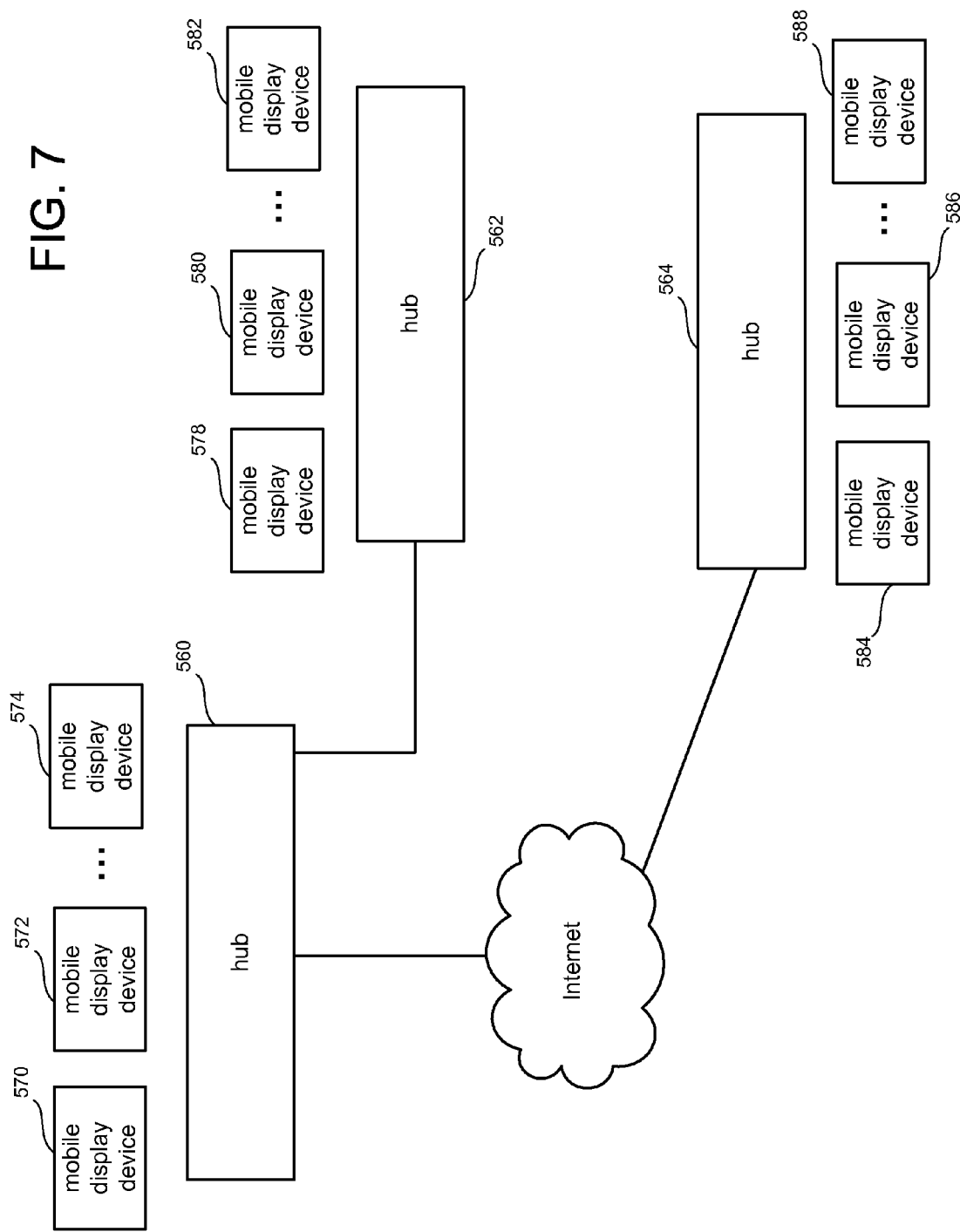
FIG. 7 is a block diagram depicting a multi-user system that can vary the focus of virtual content to be in focus for a user

In another embodiment, a multi-user system that can vary the focus of virtual and real content to be in focus for a user could include multiple hubs, with each hub including one or more mobile display devices. The hubs can communicate with each other directly or via the Internet (or other networks). For example, FIG. 7 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display device 578, 580, . . . , 582. Hub 564 communicates with mobile display device 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

Figure 8:
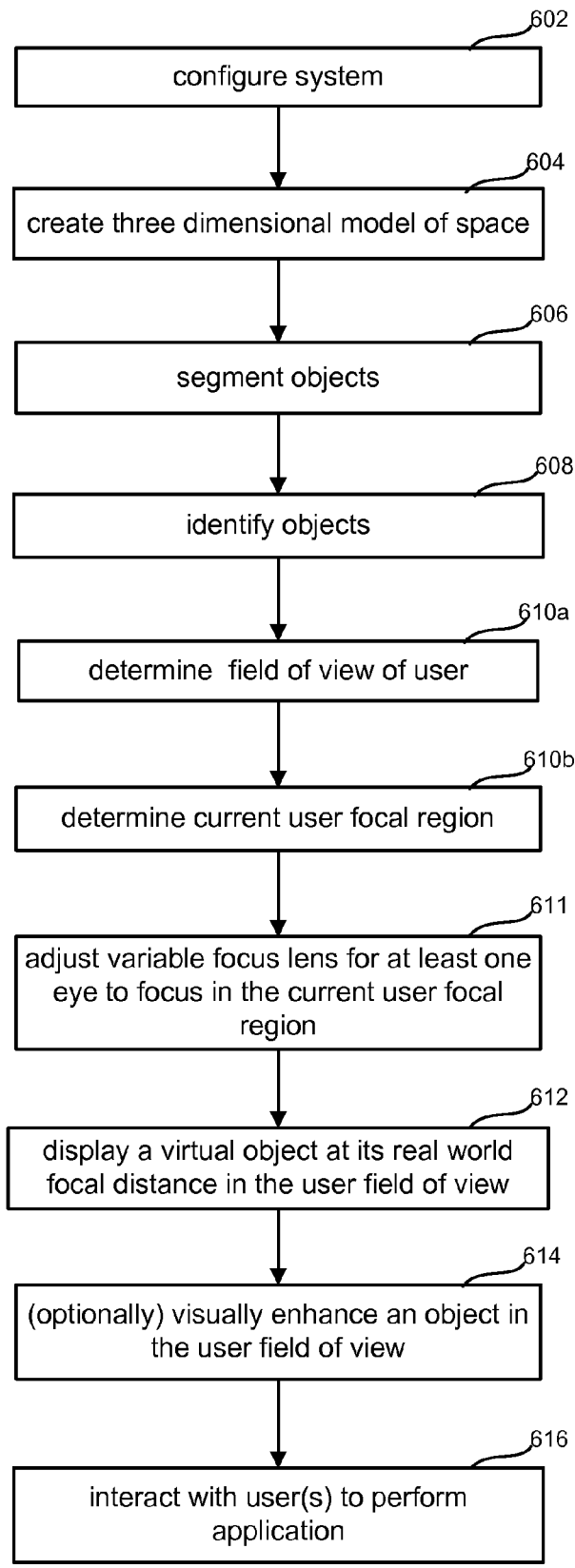
FIG. 8 is a flowchart describing one embodiment of a process for focus improvement in an augmented reality display.

FIG. 8 is a flowchart describing one embodiment of a process for focus improvement in an augmented reality display that is performed by the components discussed above. In step 602, the system is configured. For example, an application (e.g., application 452 of FIG. 5) can configure the system to indicate that a particular virtual image (representing a virtual object) is to be inserted into the three dimensional model of the scene, at a designated location. Consider an example where an empty room is populated with virtual objects to turn the empty room into a virtual reality. In another example, an application running on hub computing system 12 will indicate that a particular virtual image (representing a virtual object) is to be inserted into the scene as part of a video game or other process.

In step 604, the system will create a volumetric model of the space for which head mounted display device 2 is located. In one embodiment, for example, hub computing device 12 will use depth images from one or more depth cameras to create a three dimensional model of the environment or space in which head mounted display device 2 is located. In step 606, that model is segmented into one or more objects. For example, if hub computing device 12 creates a three dimensional model of a room, that room is likely to have multiple objects in it. Examples of objects that can be in a room include persons, chairs, tables, couches, etc. Step 606 includes determining distinct objects from each other. In step 608, the system will identify the objects. For example, hub computing device 12 may identify that a particular object is a table and another object is a chair.

In step 610*a* of FIG. 8, the system determines the field of view of the user based on the model of the user space. That is, the system determines what portion of the environment or space the user is looking at. In one embodiment, step 610*a* is a collaborative effort using hub computing device 12, processing unit 4 and head mounted display device 2. In one example implementation, hub computing device 12 will track the user and the head mounted display device 2 in order to provide a preliminary determination of location and orientation of head mounted display device 2. Sensors on the head mounted display device 2 will be used to refine the determined orientation. For example, the inertial sensors 34, described above, can be used to refine the orientation of head mounted display device 2. Additionally, the eye tracking process described above can be used to identify a subset of the initially determined field of view that corresponds to where in particular a user is looking otherwise known as the user focal region or depth focus in the field of view. More details will be described below with respect to FIGS. 14, 15 and 16.

In step 610*b*, the system such as software executing in processing unit 4, determines the user's current focal region within the user's field of view. As discussed further below in FIGS. 15 and 16, eye tracking processing based on data captured by the eye tracking camera 134 for each eye, can provide the current focal region of the user. For example, the convergence between the pupils with data indicating the face position of the user can be used to triangulate to a focal point on a focal curve, the Horopter, from which the focal region, the Panum's fusional area can be calculated. The Panum's fusion area is the area of single vision for binocular stereopsis used by human eyes.

In step 611, the focal region adjustment unit 139 under the control of the processing unit 4 via the control circuitry 136 adjusts the variable focus lens 119 positioned to be seen through for at least one eye to focus in the current user focal region. More details will be described below with respect to FIGS. 12A and 12B.

As illustrated by step 611, the focal length of variable focus lens is automatically adjusted to focus in the current user focal region by the components of the display device 2. The user does not have to take actions to change the focus of the variable focus lens when the user changes where he or she is looking. In step 612, the microdisplay assembly 173 under the control of the processing unit 4 via the control circuitry 136 will display one or more virtual objects to appear at a real world focal distance to a user in a user field of view of the user space model. That is, the system displays a virtual image in the field of view of the user at the focal depth the user is viewing while the user is looking through the head mounted display device 2. The virtual object can be a stationary object or a moving object.

In step 614, under the control of software, the processing unit 4 may alone or in cooperation with the hub computing device 12 may optionally visually enhance an object in the user field of view. For example, a real object may be visually enhanced with a virtual object in the user field of view to enhance the user's perception of the object. An embodiment of a process for such enhancement of a real object with a virtual image is discussed further below with respect to FIG. 19.

In step 616, the user of head mounted display device 2 will interact with an application running on hub computing device 12 (or another computing device) based on the virtual object being displayed in the head mounted display device 2. Each of the steps 604-614 will be described in more detail below. Additionally, each of these steps and those in the figures below may be performed continuously or be repeated as the user is using the near-eye display device 2 and changing his or her focal region when changing his or her viewpoint. For example, the three dimensional model is updated as discussed further below, and the user field of view and focal region are determined repeatedly as the user moves around or moves his or her eyes. The adjustments are made to keep up with the user or objects moving in the space.

FIG. 9 is a flowchart describing one embodiment of a process for creating a three dimensional model of the space. For example, the process of FIG. 9 is one example implementation of step 604 of FIG. 8. In step 640, hub computing system 12 receives one or more depth images for multiple perspectives of the space that the head mounted display device 2 is in. For example, hub computing device 12 can obtain depth images from multiple depth cameras, or multiple depth images from the same camera by pointing the camera in different directions or using a depth camera with a lens that allows a full view of the space for which a model will be built. In step 642, depth data from the various depth images are combined based on a common coordinate system. For example, if this system receives depth images from multiple cameras, the system will correlate the two images to have a common coordinate system (e.g., line up the images).

FIG. 10 is a flowchart describing one embodiment of a process for segmenting the model of the space into objects. For example, the process of FIG. 10 is one example implementation of step 606 of FIG. 8. In step 680 of FIG. 10, the system will receive one or more depth images from one or more depth cameras as discussed above. Alternatively, the system can access one or more depth images that it has already received. In step 682, the system will receive one or more visual images from the cameras described above. Alternatively, the system can access one or more visual images already received. In step 684, hub computing system 12 will detect one or more people based on the depth images and/or visual images. For example, the system will recognize one or more skeletons. In step 686, hub computing device 12 will detect edges within the model based on the depth images and/or the visual images. In step 688, hub computing device 12 will use the detected edges to identify distinct objects from each other. For example, it is assumed that edges are boundaries between objects. In embodiments where the near-eye display device 2 provides enhancement of real objects with virtual images to help a user see the real objects better as discussed below for FIG. 19, the processing unit 4 may send a message to the hub computing device 12 to send edge data for a selected real object for it to generate a virtual image to visually enhance for the real object. In another embodiment, the hub computing device 12 generates the virtual image with visual enhancement for the real object, and sends the virtual image to the processing unit 4 to cause the microdisplay unit 120 to display it. In step 690, the model created using the process of FIG. 9 will be updated to show which portions of the model are associated with different objects.

Figure 11:
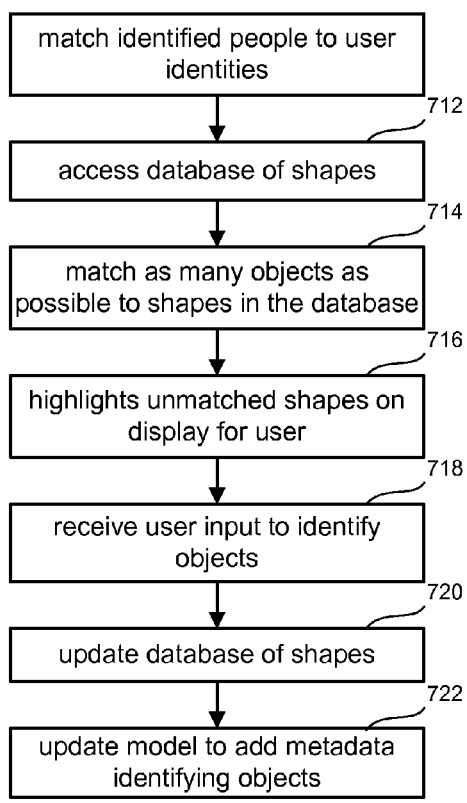
FIG. 11 is a flow chart describing one embodiment of a process for identifying objects.

FIG. 11 is a flowchart describing one embodiment of a process for identifying objects. For example, the process of FIG. 11 is one example implementation of step 608 of FIG. 8. In step 710, hub computing device 12 will match identified people to user identities. For example, the system may have user profiles that have visual images that can be matched to the images detected of the objects. Alternatively, a user profile can describe features of the person which can be match based on the depth images or visual images. In another embodiment, users may log into the system and hub computing device 12 can use the login process to identify a particular user and track that user throughout the interaction described herein. In step 712, hub computing device 12 will access the database of shapes. In step 714, hub computing device will match as many objects in the model to the shapes in the database. In step 716, those shapes that are unmatched will be highlighted and displayed to the user (e.g., using monitor 16). In step 718, hub computing device 12 will receive user input that identifies each (or a subset) of the shapes highlighted. For example, the user can use a keyboard, mouse, speech input, or other type of input to indicate what each unidentified shape is. In step 720, the database of shapes is updated based on the user input in step 718. In step 722, the model of the environment created in step 604, and updated in step 606, is further updated by adding metadata for each of the objects. The metadata identifies the object. For example the metadata may indicate that the particular object is a round shiny table, John Doe, green leather couch, etc.

Figure 11A:
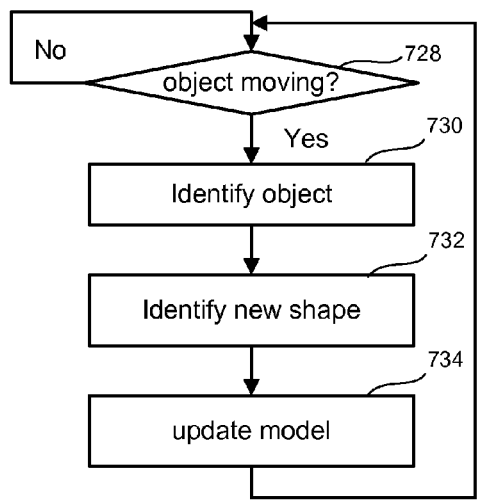
FIG. 11A is a flow chart describing one embodiment of a process for updating the model in response to a moving object.

FIG. 11A is a flow chart describing one embodiment of a process for updating the model created by the process of FIG. 9 in response to moving objects (e.g., a moving person or other type of object). In step 728, the system determines that an object is moving. For example, the system will continuously receive depth images. If the depth images change over time, then an object is moving. If no moving object is detected, then the system will continue to receive depth images and continue to look for moving objects.

If there is a moving object, then in step 730 the system will identify the object that is moving. Frame differencing or any of various tracking technologies can be used to recognize the moving object and correlate the recognized object to one of the objects identified in step 608 of FIG. 8. Some objects will change shape when moving. For example, a human may change shape as the human walks or runs. In step 732, the new shape of the moving object is identified and stored. In step 734, the model of the environment that was previously created is updated based on the new position and shape of the moving object. The process of FIG. 11A can be performed by processing unit 4 of hub computing device 12.

Figure 12A:
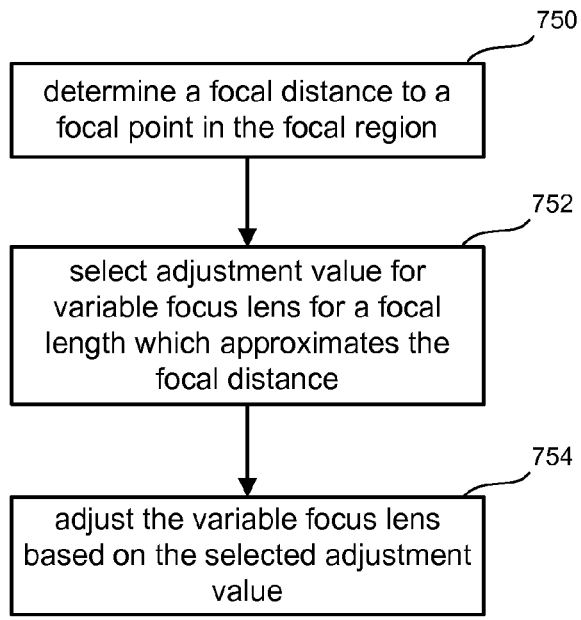
FIG. 12A is a flow chart describing an embodiment of a process for adjusting a variable focus lens in the current user focal region.

FIG. 12A is a flow chart describing an embodiment of a process for adjusting a variable focus lens in the current user focal region. Under the control of software, the processing unit 4 alone or in collaboration with the hub computing system 12 determines in step 750 a focal distance from the user's eye to a determined focal point in the current user focal region. As discussed above and below, the focal point may be determined from the eye tracking data. In one example, a ray can be cast from a starting point approximating the retina of each eye based on measurements of a position and angle of each eye to an end point where the rays from each eye meet. The end point may be selected as the focal point. In another example, the focal point may be determined from an inference process based on the user's head position, the objects of the scene and the context of the application (e.g. 452) executing. Simultaneous localization and mapping (SLAM) techniques may also be used. In other examples, one or more focal point determination techniques can be used in combination.

The processing unit 4 in step 752 selects an adjustment value for the variable focus lens 119, typically for each lens for each eye, but in any case, for at least one lens 119 (e.g. monocular HMD). The selected adjustment value is for a focal length which approximates the determined focal distance.

Figure 12B:
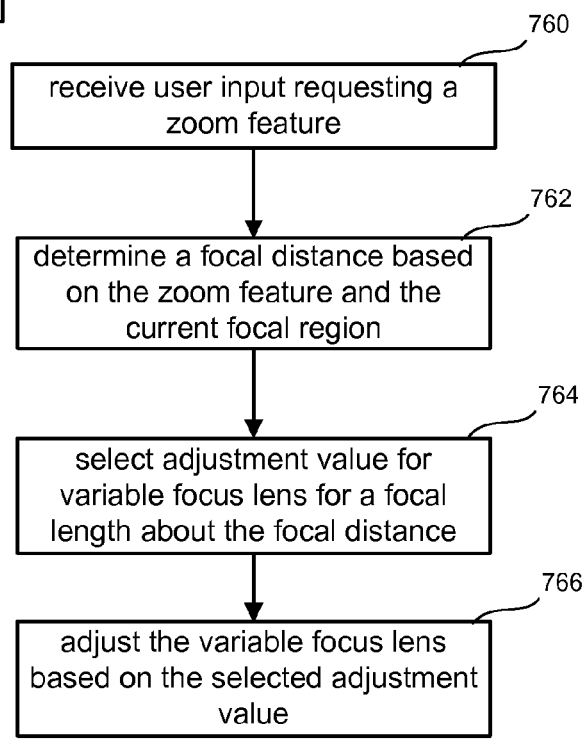
FIG. 12B is a flow chart describing an embodiment of a process for adjusting a variable focus lens for a zoom feature.

FIG. 12B is a flow chart describing an embodiment of a process for adjusting a variable focus lens for a zoom capability. In step 760, the processing unit 4 receives user input requesting a zoom level. The user input may be captured as audio by microphone 110 or as gestures captured by the depth cameras 20A and 20B and processed by the hub computing device 12. In other embodiments, user input or commands may be determined, at least in part, via measuring the potentials on eye muscles for user input protocols based on blinking or other eye movements.

The user input may be captured as audio by microphone 110 or as gestures captured by the depth cameras 20A and 20B and processed by the hub computing device 12. The processing unit 4 or the hub computing device 12 or both in collaboration in step 762 determine a focal distance based on the zoom level and the current focal region. Next in step 764, an adjustment value is selected for a variable focus lens for a focal length which approximates the focal distance, and the focal region adjustment unit 139 adjusts the variable focus lens based on the selected adjustment value in step 766.

To the extent allowed by the range of size, convexity and concavity of the variable focus lens 119, a user may select a zoom feature. An example of a zoom feature is an ability to focus which is superior to normal ability such as the ability to see in-focus at 20 feet what others with normal vision can only see at 10 feet. In one example, normal vision may be vision of 20/20 or 6/6 with no Presbyopia. A zoom feature may also be to see a specific distance further or closer or a multiplier of the current focal distance.

The types of virtual objects and their location in a user field of view is determined by the application 452 based on default parameters, user input, or a combination of both. For example, a user may have selected a real world object of a coffee table in the room where he is running the application 452 to appear as a boulder. The virtual boulder's target location will be related to the location of the coffee table in the three dimensional model. In another example, a virtual dolphin may be selected by a user to swim around the room. The motion of the dolphin virtually around the room may be implemented by a trajectory path of the dolphin object in which a target location for the dolphin is updated in each display frame. Even if a user stares at the boulder, the dolphin will likely come in and out of the user's focal region and field of view generally. As the user moves his or her eyes or head, the user field of view and current focal region is updating with these movements as well. One or more virtual objects may be located in the user focal region and user field of view at any given time.

Figure 13:
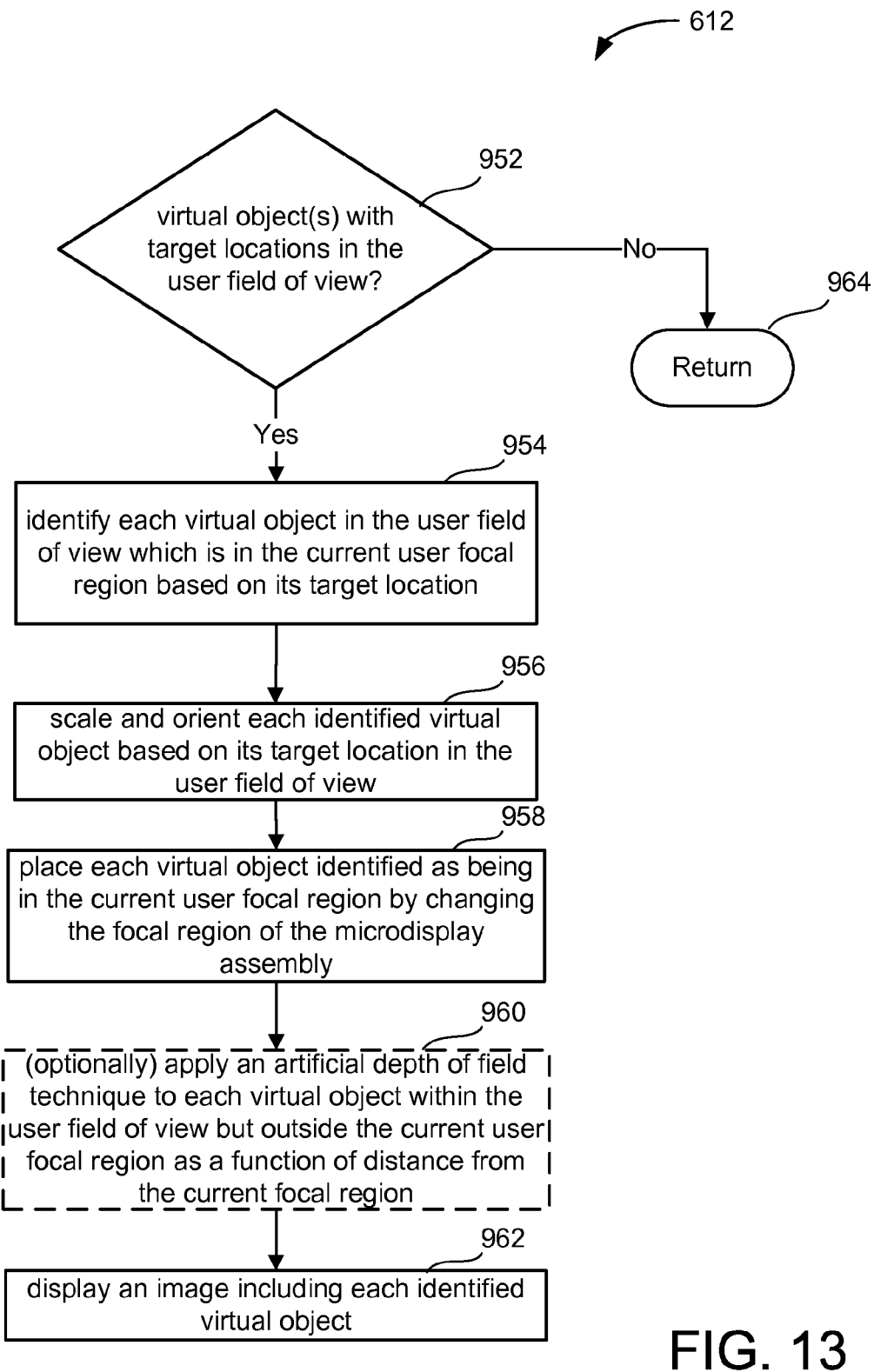
FIG. 13 is a flowchart describing one embodiment of a process for displaying a virtual object to be in focus when viewed by a user viewing a near-eye display.

FIG. 13 is a flowchart describing one embodiment of a process for displaying a virtual object to be in focus when viewed by a user viewing a near-eye display. For example, the process of FIG. 13 is one example implementation of step 612 of FIG. 8. The system determines whether there are any target locations of virtual objects in the user's current field of view in step 952. Software executing in one or more computer systems such as the hub computing device 12 or the processing unit 4 will identify the location of the target in the field of view. In one embodiment, hub computing device 12 will provide the model to processing unit 4. As part of step 952, processing unit 4 will use the model of the environment and knowledge of the position and orientation of the user to determine whether the target location of any virtual object is within the user's field of view.

Figure 19:
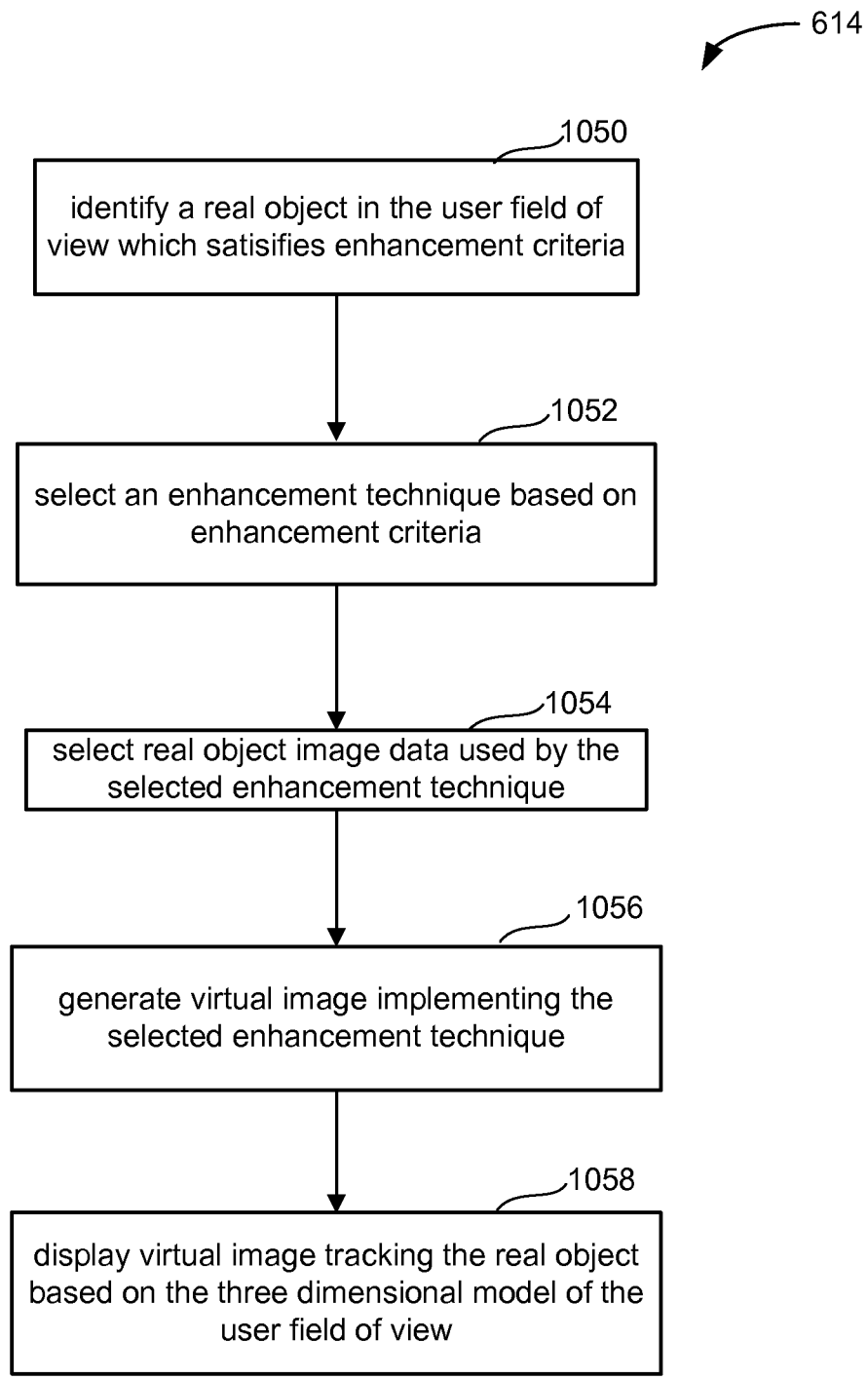
FIG. 19 is a flowchart describing one embodiment of a process for enhancing a real object with a virtual image in the user field of view.

If there are no virtual objects in the user's current field of view, the processing in step 964 returns to implementing the other steps of the process embodiment such as those in FIG. 8 or FIG. 19. In step 954, software executing in the hub computer system 12, the processing unit 4 or both identifies each virtual object in the user field of view which is in the current user focal region based on its target location in the model.

In step 956, processing unit 4 will scale and orient each identified virtual object for an image to be inserted into the user's view. The scaling and orienting of the virtual object will be based on its target location in the user field of view.

In step 958, processing unit 4, control circuitry 136 or both share processing to place each virtual object identified as being in the current user focal region by changing the focal region of the microdisplay assembly 173. Optionally, in step 960, an artificial depth of field technique may be applied to each virtual object whose target location is within the user's field of view but outside the user's current focal region as a function of distance from the current focal region. An example of an artificial depth of field technique is an artificial blur technique.

Artificial blur can be achieved by applying a depth of field shader or other a Gaussian blur filter to simulate the object being out of focus as function of distance from the focal region. The technique may be performed in whole or in part by software executing on the hub computer 12, the processing unit 4 or both. For ease of description, reference will be made to the processing unit 4. From a depth value as part of the target location of a virtual object, the focal distance of the object in the image is determined by the processing unit 4 which also determines which pixels on a display element 112 like that enclosing the lightguide optical element 112 will map to the virtual objects in an image. Based on the focal distance, one or more weighted Gaussian blur filters are applied to cover at least two dimensions by convolving the image with a Gaussian function such that the transformations applied to pixels further from the focal point or fixation point of the image are will receive more blurring effects. In one example, the Gaussian blur filter acts as a low pass filter removing high frequency information.

In step 962, the microdisplay 120 displays a virtual image including each identified virtual object. In one example, the processing unit 4 sends instructions to display driver 220 of control circuitry 136 for display on microdisplay 120 of the virtual image including each virtual object in the user field of view. The lens system 122 then projects the virtual image received from the microdisplay 120 onto the reflecting elements 124a and 124b and towards the user's eyes as in FIG. 1C or onto the reflecting element 124 and into the lightguide optical element 112 for viewing by the user as in FIG. 1B or 1D. In one implementation, the display the user is looking through in the head mounted display device (e.g., the lightguide optical element 112) is divided into pixels. Step 962 may include determining which pixels correspond to the target location, and those pixels will display a virtual image including each identified virtual object in step 962. The processing steps of FIG. 13 can be performed continuously during operation of the system such that the user field of view and user focal region are updated as the user moves his or her head, and the virtual objects may be displayed as naturally moving in and out of focus for the user accordingly.

FIG. 16 is a flowchart describing one embodiment of a process for determining the field of view a user, which is an example implementation of step 610a of FIG. 8, and for determining the user focal region, which is an example implementation of step 610b of FIG. 8. The process of FIG. 16 relies on information from the hub computing device 12 and the eye tracking technology described above. FIG. 14 is a flowchart describing one embodiment of a process performed by the hub computing system to provide tracking information used in the process of FIG. 16. FIG. 15 is a flowchart describing one embodiment of a process for tracking an eye, the results of which are used by the process of FIG. 16.

In step 810 of FIG. 14, the hub computing device 12 will track the user's position. For example, hub computing device 12 will use one or more depth images and one or more visual images to track a user (e.g., using skeleton tracking). One or more depth images and one or more visual images can be used to determine the position of the head mounted display device 2 and the orientation of the head mounted display device 2 in step 812. In step 814, the position and orientation of the user and the head mounted display device 2 are transmitted from the hub computing device 12 to processing unit 4. In step 816, the position and orientation information is received at processing unit 4. The processing steps of FIG. 14 can be performed continuously during operation of the system such that the user is continuously tracked.

FIG. 15 is a flowchart describing one embodiment for tracking an eye using the technology described above. In step 860, the eye is illuminated. For example, the eye can be illuminated using infrared light from eye tracking illumination 134A. In step 862, the reflection from the eye is detected using one or more eye tracking cameras 134B. In step 864, the reflection data is sent from head mounted display device 2 to processing unit 4. In step 866, processing unit 4 will determine the position of the eye based on the reflection data, as discussed above. In step 868, processing unit 4 will also determine the focal depth location or focal region the user's eyes are viewing based on the reflection data. The processing steps of FIG. 15 can be performed continuously during operation of the system such that the user's eyes are continuously tracked providing data for tracking the current user focal region.

FIG. 16 is a flowchart describing one embodiment of a process for determining the field of view of the user (e.g., step 610a of FIG. 8) and the focal region of a user (e.g., step 610b of FIG. 8). In step 902, processing unit 4 will access the latest position and orientation information received from the hub. The process of FIG. 14 can be performed continuously as depicted by the arrow from step 814 to step 810, therefore, processing unit 4 will periodically receive updated position and orientation information from hub computing device 12. However, processing unit 4 will need to draw the virtual image more frequently than it receives the updated information from hub computing device 12. Therefore, processing unit 4 will need to rely on information sensed locally (e.g., from the head mounted device 2) to provide updates to the orientation in between samples from hub computing device 12. In step 904, processing unit 4 will access data from three axis gyro 132B. In step 906, processing unit 4 will access data from three axis accelerometer 132C. In step 908, processing unit 4 will access data from three axis magnetometer 132A. In step 910, processing unit 4 will refine (or otherwise update), the position and orientation data from hub computing device 12 with the data from the gyro, accelerometer and magnetometer. In step 912, processing unit 4 will determine the potential field of view based on the location and orientation of head mounted display device.

In step 914, processing unit 4 will access the latest eye position information. In step 916, processing unit 4 will determine a portion of the model being viewed by the user, as a subset of the potential field of view, based on eye position. For example, the user may be facing a wall and, therefore, the field of the view for the head mounted display could include anywhere along the wall. However, if the user's eyes are pointed to the right, then step 916 will conclude that the field of view of the user is only the right hand portion of the wall. At the conclusion of step 916, processing unit 4 has determined the field of view of the user through head mounted display 2. Processing unit 4 can identify a target location of a virtual object within that field of view. In step 918, processing unit 4 determines the current user focal region with the portion of the model based on eye position. Processing unit 4 can identify a target location in the model of a virtual object that is within the current user focal region. The processing steps of FIG. 16 can be performed continuously during operation of the system such that the user's field of view and focal region are continuously updated as the user moves his or her head, and the virtual objects may be displayed as naturally moving in and out of focus for the user accordingly.

Figure 17A:
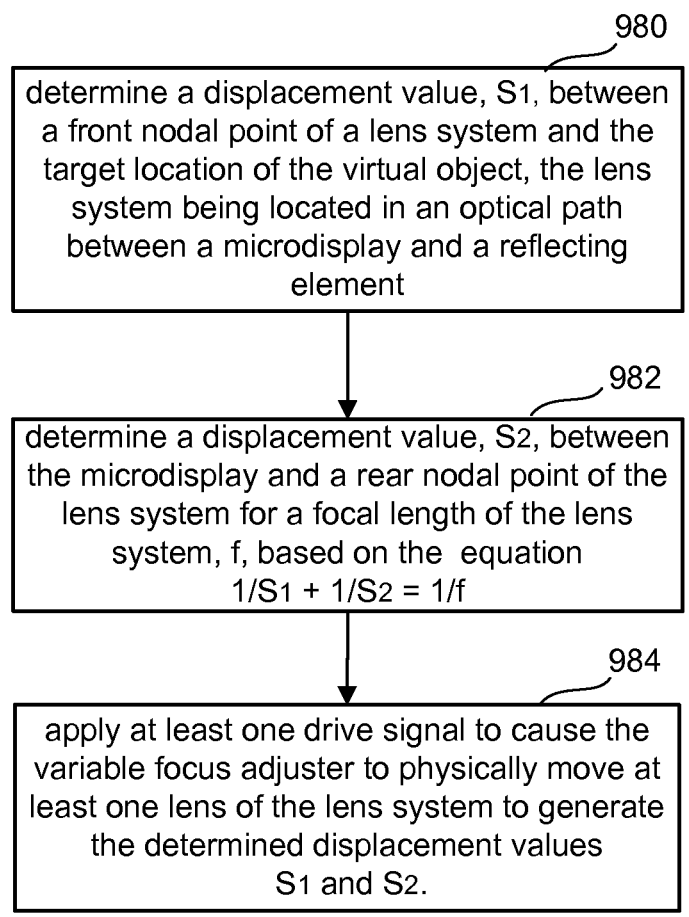
FIG. 17A is a flowchart describing one embodiment of a process for changing a focal region of a microdisplay assembly by displacing at least one lens of the assembly.

FIG. 17A is a flowchart describing one embodiment of a process for changing a focal region of a microdisplay assembly 173 by displacing at least one lens of the assembly. This embodiment may be used to implement step 958 in FIG. 13.

For an illustrative context, a microdisplay assembly 173 as described previously with respect to FIGS. 1B and 1C is referenced. The microdisplay assembly 173 comprises the microdisplay unit 120 aligned in an optical path 133 with a lens system 122 which directs the image light from the microdisplay unit 120 to the reflecting element 124 or reflecting elements 124a, 124b and either into the user's eyes or another optical element 112. The microdisplay assembly 173 also includes the variable virtual focus adjuster 135 for physically moving one of the light processing elements to obtain a selected or determined focal region.

Before the discussions of FIGS. 2A-2D, the microdisplay assembly 173 displacements and focal lengths are related by the following equation $1/S_1 + 1/S_2 = 1/f$. In step 980, the processing unit 4 determines a displacement value, $S_1$, between a front nodal point of the lens system 122 and the target location of the virtual object. Additionally, in step 982, the processing unit 4 determines a displacement value, $S_2$, between the microdisplay 120 and the rear nodal point of the lens system for a focal length of the lens system, f, based on the equation. The processing unit 4 causes in step 984 the processor of the control circuitry 136 to cause the variable adjuster driver 237 to apply at least one drive signal to the variable virtual focus adjuster 135 to physically move at least one lens of the lens system to generate the determined displacement values $S_1$ and $S_2$. Besides the microdisplay assembly 173 shown in FIGS. 1B and 1C, another implementation is a microdisplay assembly 173 using the insertable lens system example of FIG. 2D. The movement is that of releasing an arm 123 for one lens if in place and moving an arm 123 for the lens at the determined displacement to lock the lens in the optical path 133. Additionally the focal length of the inserted lens may affect the resultant value for $S_1$ 1.

FIG. 17B is a flowchart describing one embodiment of a process for changing a focal region of a microdisplay assembly 173 by changing a polarization of at least one lens of the assembly. This embodiment may be used to implement step 958 in FIG. 13 and is suitable for use with the embodiment of a microdisplay assembly 173 such as that shown in FIG. 2C. In this embodiment, the lens system includes at least one birefringent lens in the optical path between the microdisplay 120 and the reflecting element 124 (FIG. 1C), 124a (FIG. 1B). In step 986, the processing unit 4 selects a displacement value for $S_1$ based on a target location of a virtual object and the equation $1/S_1 + 1/S_2 = 1/f$. In step 988, the variable adjuster driver 237 applies at least one drive signal to cause the variable focus adjuster 135 to change the polarization of the at least one birefringent lens to change the focal length, f, of the birefringent lens to generate the selected $S_1$ value. Since each birefringent lens has two discrete focal lengths corresponding to two polarization axes, a combination of two such lenses gives a selection of four discrete focal lengths. Thus, under the control of software, the processing unit 4 or the processor 210 of control circuitry 136 selects the closest available focal length to approximate the value of f. For each birefringent lens added, the number of discrete focal lengths doubles.

Figure 17C:
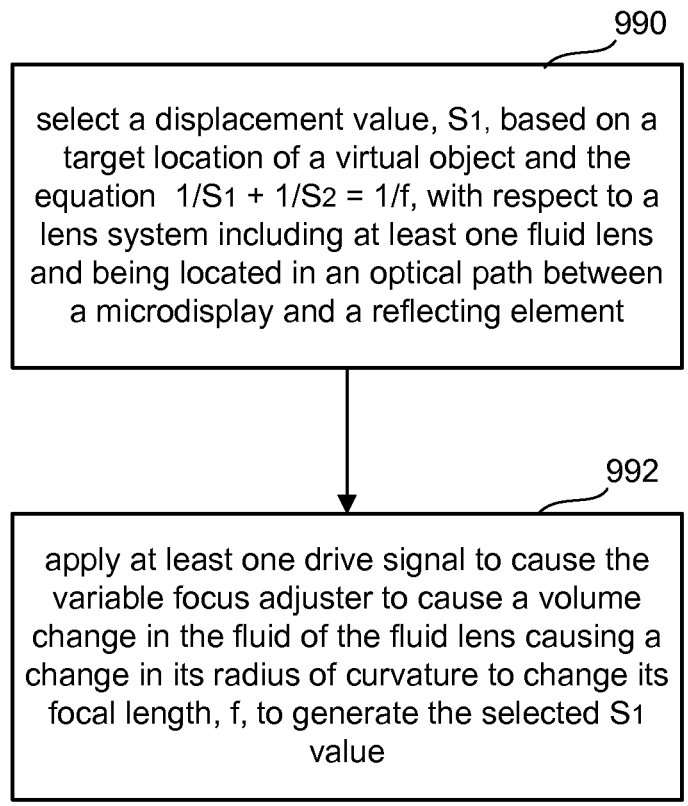
FIG. 17C is a flowchart describing one embodiment of a process for changing a focal region of a microdisplay assembly by changing a radius of curvature of at least one liquid lens of the assembly.

FIG. 17C is a flowchart describing one embodiment of a process for changing a focal region of a microdisplay assembly 173 by changing a radius of curvature of at least one liquid lens of the assembly. This embodiment may be used to implement step 958 in FIG. 13 and is suitable for use with the embodiment of a microdisplay assembly 173 employing at least one liquid or fluid lens in its lens system 122 such as that shown in FIGS. 2B1, 2B2 and 2B3. In step 990, the processing unit 4 selects a displacement value for $S_1$ based on a target location of a virtual object and the equation $1/S_1 + 1/S_2 = 1/f$. In step 992, the variable adjuster driver 237 applies at least one drive signal to cause the variable focus adjuster 135 to cause a volume change in the fluid of the fluid or liquid lens causing a change in its radius of curvature to change its focal length, f, to generate the selected $S_1$ value As mentioned above in the embodiment of FIG. 13, for the virtual objects in the user field of view but not in the focal region of the user, artificial blur techniques may be applied. In other embodiments, a series of images at different focal regions may be generated. By moving through a range of foci or focal regions and displaying an image at each focal region, the user can be made to see an image composed of layers of different focal region images. When the user readjusts his or her focus, the user will settle on one of those regions, and virtual objects in the rest of the regions will be naturally blurred. The sweeping through a range of focal regions may be done at a predetermined rate or frequency. This is done rapidly enough so that human temporal image fusion will make them all appear to be present at once. The need for artificial depth of field techniques such as artificial blur will be reduced, although the rendering load may increase significantly.

The movement through a range of focal regions can be implemented in one embodiment by changing the displacement between light processing elements of the microdisplay assembly 173 or the optical power of a light processing element in the assembly at a rate of speed. The rate of speed may be at least as much as a frame rate of 30 frames per second (fps), but can be in some embodiments at a higher rate of speed such as 60, 120 or 180 Hz. A lens which is displaced along an optical axis at a high rate of speed providing images at different focal regions is sometime referred to as a vibrating lens or an oscillating lens. In some instances, the image source 120 is moved rather than a lens system 122 but the principal is the same.

Figure 18A:
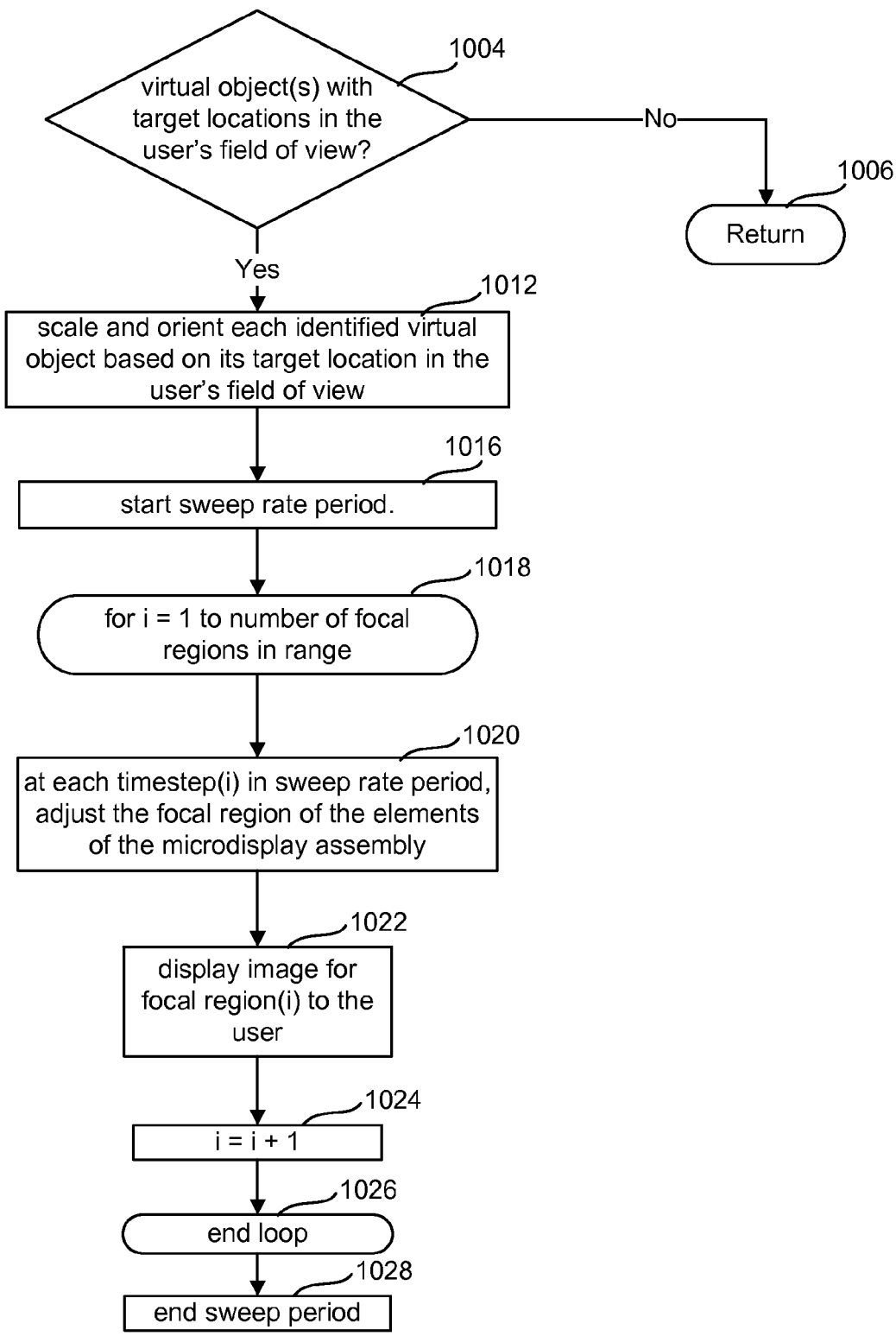
FIG. 18A is a flow chart describing one embodiment of a process for generating virtual object images in different focal regions in an augmented reality display.

FIG. 18A is a flow chart describing one embodiment of a process for generating virtual object images in different focal regions in an augmented reality display that may be used to implement step 612 in FIG. 8. In FIG. 18A, the hub computing device 12 or the processing unit 4 or both under the control of software determines in step 1004 whether there are any target locations of virtual objects in the user's current field of view like in step 952. Similar to step 964, if there are no virtual objects in the user's current field of view, the processing in step 1006 returns to implementing the other steps of the process embodiment such as those in FIG. 8 or FIG. 19.

Like in step 956, processing unit 4 may scale and orient each identified virtual object based on its target location in the user's field of view for an image to be inserted into the user's view in step 1012.

In step 1016, a sweep rate period is started by the timing generator 226 or clock generator 244 of the control circuitry. In step 1018 a counter is initialized to go through a number of focal regions in the range during the sweep period. In some instances, the focal regions are predetermined. At each timestep of the sweep rate period, the focal region of the elements of the microdisplay assembly 173 are adjusted, and an image is displayed for each focal region at its sweeptime or timestep to the user in step 1022. The next focal region is selected in step 1024 by incrementing the counter, and the processing of steps 1020 through 1024 are repeated until the counter indicates the range sweep is complete. The sweep period ends in step 1028. In other examples, an end of frame for a display may interrupt a sweep through the sweep range, and another sweep begin with the next frame.

In one embodiment, the rendering load may be reduced by rendering a subset of focal regions and using tracking of the user focal region to optimize which focal regions are selected for rendering. In other examples, the eye tracking data does not provide sufficient precision to determine the depth of focus location the user is viewing. Inference logic may infer an object on which the user is focused. Once an object is selected as the object of focus, the three dimensional model or mapping of the current scene may be used to determine the distance to the object of focus.

Figure 18B:
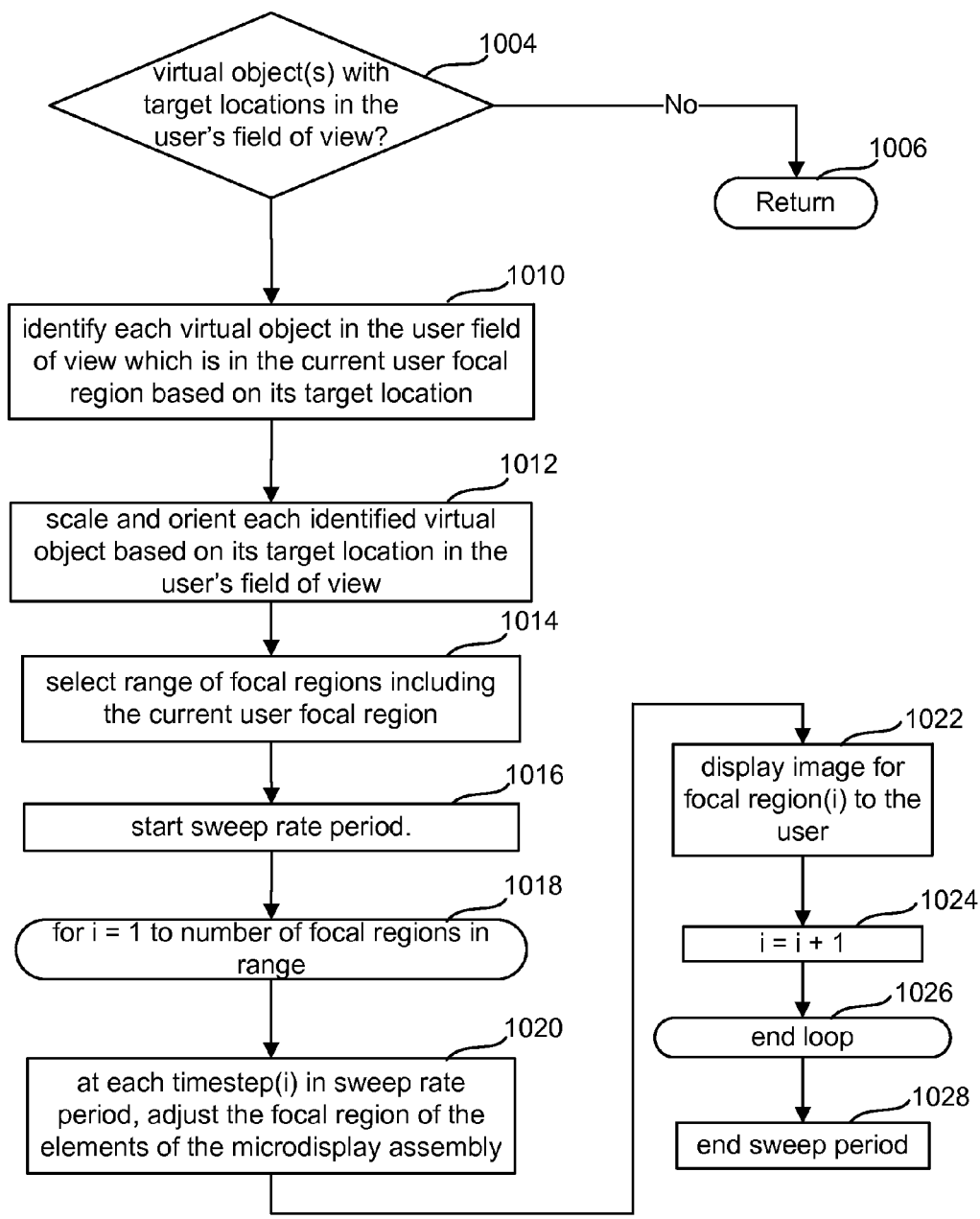
FIG. 18B is a flow chart describing another embodiment of a process for generating virtual object images in different focal regions in an augmented reality display.

FIG. 18B illustrates another embodiment of a process for displaying a virtual object to be in focus when viewed by a user viewing an augmented reality display that may be used to implement step 612 in FIG. 8. FIG. 18B is a flow chart describing one embodiment of a process for generating virtual object images in different focal regions in an augmented reality display. In FIG. 18B, the hub computing device 12 or the processing unit 4 or both under the control of software determines in step 1004 whether there are any target locations of virtual objects in the user's current field of view like in step 952. Similar to step 964, If there are no virtual objects in the user's current field of view, the processing in step 1006 returns to implementing the other steps of the process embodiment such as those in FIG. 8 or FIG. 19.

If there is at least one virtual object having a target location in the user's field of view, then in step 1008 like in step 954, software executing in the hub computer system 12, the processing unit 4 or both identifies in step 1010 each virtual object in the user field of view which is in the current user focal region based on its target location of the virtual object in the model. Like in step 956, processing unit 4 will scale and orient each virtual object based on its target location in the user's field of view for an image to be inserted into the user's view in step 1012.

In step 1014, the processing unit 4 selects a range of focal regions including the current user focal region. The processing unit 4 may select the range of focal regions based on criteria such as the context of the executing application, e.g. 452. An application may use a selection of virtual objects with predetermined motion trajectories and events which trigger their appearance. As the model of objects is updated with the movement of objects, the processing unit 4 receives these updates as per the discussion of FIGS. 9 through 11A. In between updates, the processing unit 4 may use the sensor data on position and orientation of the user's head to determine which virtual objects he or she is likely focusing on at the time. The processing unit 4 may select a number of focal regions in which the trajectory of the virtual object will travel based on the three dimensional model of the scene. Therefore, one example criteria is to include each focal region in which a virtual object is located. In addition, focal regions may also be selected in which regions the trajectory of a moving virtual object will be in a predetermined time frame. The predetermined time frame may be until the next update of model data indicating the exact locations of virtual objects in one example.

The starting focal region point for sweeping through the range of focal regions may be the one closest to infinity in the user field of view from the user's eyes. Other starting locations may be used. In step 1016, a sweep rate period is started by the timing generator 226 or clock generator 244 of the control circuitry. In step 1018 a counter is initialized to go through a number of focal regions in the range during the sweep period. In some instances, the focal regions are predetermined. At each timestep of the sweep period, the focal region of the elements of the microdisplay assembly 173 are adjusted, and an image is displayed for each focal region at its sweeptime or timestep to the user in step 1022. The next focal region is selected in step 1024 by incrementing the counter, and the processing of steps 1020 through 1024 are repeated until the counter indicates the range sweep is complete. The sweep period ends in step 1028. In other examples, an end of frame for a display may interrupt a sweep through the sweep range, and another sweep begin with the next frame.

As previously discussed, focal limitations can cause a user not to see real or virtual objects clearly in certain focal regions. For example, presbyopia can limit the ability to see objects clearly for a user with presbyopia over age 50 to a range no less than about 1.5 feet. Visual enhancement of virtual and real objects can also improve a user's perception of a scene. The virtual objects may be visually enhanced, and virtual images which track with and visually enhance a real object may also be used.

Enhancement criteria may be used by the processing unit 4, the hub computing device 12 or both to determine which real object in a user field of view qualifies for enhancement. One factor may be the real object represents another person. Another factor may be the real object satisfies motion criteria such as it has moved a certain distance or its speed or acceleration satisfies a threshold. For example, in a war game, the real object may be a projectile. Also, in the war game example, the type of object may qualify it for enhancement. If the real object is a gun, for example, it may be highlighted or colored red to catch the attention of a player with less than normal vision.

FIG. 19 is a flowchart describing one embodiment of a process for visually enhancing a real object with a virtual image in the user field of view. This process may be used to implement step 614 of FIG. 8. The processing unit 4 in step 1050 identifies a real object in the user field of view which satisfies enhancement criteria, and selects in step 1052 an enhancement technique based on enhancement criteria. For example, a real object which is accelerating may have its edges enhanced by highlighting which tracks the real object applied to it. In another example, a sharp virtual outline of the edges of the real object may be tracked at a focal distance the user has better focusing ability at while the real object is still out of focus. Simpler enhancements such as a virtual box or circle may be displayed in a portion of the field of view in which a real object of interest is located. Additionally, color may be used to enhance real objects in a virtual overlay. For example, in a night vision mode, a different color may be used in a virtual overlay for a real object of interest. The processing unit in step 1054 selects real object image data used by the selected enhancement technique. An example would be the edge data detected by the hub computing device 12 at step 686 of FIG. 10.

The processing unit 4 can request the data to generate a virtual image for the real object in step 1056 for the selected technique or the hub computing device 12 can generate the virtual image at the request of the processing unit 4. In step 1058, the virtual image is displayed to track the real object based on the three dimensional model of the user field of view.

For a virtual object, a similar process to that of FIG. 19 may also be employed to visually enhance the virtual object. A separate virtual image may track the virtual object or the image data of the virtual object may be updated to include the enhancement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An augmented reality system providing improved focus of objects comprising:
   a see-through display device having a support structure, the see-through display positioned by the support structure and one or more physical environment facing cameras positioned by the support structure for capturing depth images of a space in which the see-through display device is located;
   a memory storing software and data;
   a processor determining a three-dimensional current field of view as seen through the see-through display based on a three dimensional model of the space in which the see-through display device is located and the captured depth images under the control of software, the processor having access to the memory and being communicatively coupled to a microdisplay assembly;
   the processor being operable to determine a current focal region in the three dimensional current field of view;
   the microdisplay assembly attached to the see-through display device, the microdisplay assembly including a microdisplay, one or more optical elements, and a variable virtual focus adjuster for changing an optical path between the microdisplay and the one or more optical elements of the microdisplay assembly;
   the processor causing the microdisplay assembly to generate an in-focus virtual image which will display in-focus in the determined current focal region by controlling the variable virtual focus adjuster to adjust a focal region of the microdisplay assembly based on detected edges of the objects to identify distinct objects for enhancement; and
   the see-through display of the see-through display device being optically coupled to receive and to display the in-focus virtual image generated for the determined current focal region.

2. The system of claim 1, further comprising:
   the see-through display includes a variable focus lens positioned to be seen through;
   the processor receiving input requesting a zoom feature;
   the processor determining a focal distance based on the requested zoom feature and the current focal region;
   the processor selecting an adjustment value for the variable focus lens for a focal length about the focal distance; and
   a focal region adjuster adjusting the variable focus lens in the see-through display based on the selected adjustment value.

3. The system of claim 2, wherein the variable focus lens is a liquid lens.

4. The system of claim 3, wherein:
   the focal region adjuster focuses the variable focus lens by adjusting the radius of curvature of the liquid lens to adjust the focal length of the lens to be about the focal distance determined for the zoom feature.

5. In an augmented reality system, a method for providing improved focus of objects comprising:
   determining a field of view of a see-through display of an augmented reality (AR) display device based on a three dimensional model of a space in which the AR display device is located, the space including a real object, and depth images of the space captured by one or more physical environment facing cameras supported by the AR display device;
   determining a current focal region in the field of view; and
   displaying a virtual object at its real world focal distance in the field of view by
   identifying each virtual object which is in the current focal region based on its location in the three dimensional model,
   placing each virtual object identified as being in the current focal region by a variable virtual focus adjuster for changing the focal region of a microdisplay assembly by changing an optical path between the microdisplay and one or more optical elements of the microdisplay assembly, the variable virtual focus adjuster rotating a rotatable lens system,
   generating an in-focus image including each identified virtual object in the current focal region by the microdisplay assembly,
   optically receiving the in-focus image including each identified virtual object in the current focal region by the see-through display, and
   displaying the in-focus image including each identified virtual object in the current focal region by the see-through display.

6. The method of claim 5, wherein:
   determining the current focal region further comprises determining the current focal region based upon eye tracking data.

7. The method of claim 5, further comprising:
   visually enhancing a real object in the field of view.

8. The method of claim 7, wherein:
   visually enhancing the real object in the field of view further comprises:
     identifying the real object in the field of view which satisfies enhancement criteria;
     selecting an enhancement technique based on the enhancement criteria;
     selecting real object image data used by the selected enhancement technique;
     generating a virtual image implementing the selected enhancement technique; and
     tracking the display of the virtual image to the real object based on the three dimensional model.

9. The method of claim 8, wherein:
   the real object image data is edge data and the enhancement technique is one of the group consisting of:
   edge enhancement of the at least one real object;
   highlighting of the at least one real object; and
   color enhancement of the at least one real object.

10. The method of claim 9, wherein:
    the enhancement criteria is motion criteria for the real object.

11. The method of claim 5, further comprising:
    displacing at least one lens of the rotatable lens system by determining a first displacement value ($S_1$) between a front nodal point of the rotatable lens system and a target location of the virtual image,
    determining a second displacement value ($S_2$) the microdisplay and a rear nodal point of the rotatable lens system for a focal length based on the equation:

$1/S_1 + 1/S_2 = 1/f$; and applying at least one drive signal to the variable virtual focus adjuster to move at least one lens of the rotatable lens system to generate the determined first and second displacement values.

12. The method of claim 11, further comprising:
    selecting the first displacement value based on the target location of the virtual image and the equation; and
    applying the at least one drive signal to cause the variable virtual focus adjuster to change polarization of at least one birefringent lens in the microdisplay assembly to change the focal length to generate a selected value.

13. The method of claim 11, further comprising:
selecting the first displacement value based on the target location of the virtual image and the equation; and
applying the at least one drive signal to cause the variable virtual focus adjuster to effect a volume change in at least one lens, the at least one lens configured as a liquid lens, to change a radius of curvature to adjust the focal length to generate a selected value.

* * * * *